United States Patent
Baba

(10) Patent No.: US 11,526,114 B2
(45) Date of Patent: Dec. 13, 2022

(54) CLEANING TRANSPARENT MEMBER PROVIDED ON IMAGE FORMING APPARATUS TO REDUCE FOREIGN MATTER

(71) Applicant: CANON KABUSHIKI KAISHA, Tokyo (JP)

(72) Inventor: Tomoki Baba, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/996,709

(22) Filed: Aug. 18, 2020

(65) Prior Publication Data

US 2020/0379398 A1  Dec. 3, 2020

Related U.S. Application Data

(63) Continuation of application No. PCT/JP2019/006594, filed on Feb. 21, 2019.

(30) Foreign Application Priority Data

Mar. 5, 2018  (JP) .............................. JP2018-038850

(51) Int. Cl.
*G03G 21/00* (2006.01)
*G03G 15/00* (2006.01)
*G03G 21/16* (2006.01)
*B41J 29/17* (2006.01)
*G03G 15/04* (2006.01)

(52) U.S. Cl.
CPC ............ *G03G 21/00* (2013.01); *G03G 15/502* (2013.01); *G03G 15/5016* (2013.01); *G03G 21/1666* (2013.01); *B41J 29/17* (2013.01); *G03G 15/04* (2013.01); *G03G 2221/0089* (2013.01); *G03G 2221/1627* (2013.01); *G03G 2221/1636* (2013.01)

(58) Field of Classification Search
CPC .. G03G 15/5016; G03G 15/502; G03G 15/04; G03G 21/00; G03G 21/1666; G03G 2221/0089; G03G 2221/1627; G03G 2221/1636; G03G 2221/0005; G03G 2221/0026; G03G 2221/1618; B41J 29/17
See application file for complete search history.

(56) References Cited

U.S. PATENT DOCUMENTS

2014/0348529 A1* 11/2014 Takahashi ........ G03G 15/04036
399/71
2016/0246242 A1  8/2016 Ganesan

FOREIGN PATENT DOCUMENTS

| JP | 2014-081584 A | 5/2014 |
| JP | 2015-199278 A | 11/2015 |
| JP | 2016-031467 A | 3/2016 |

* cited by examiner

*Primary Examiner* — Joseph S Wong
(74) *Attorney, Agent, or Firm* — Canon U.S.A., Inc. I.P. Division

(57) ABSTRACT

A movement member that causes a cleaning member to move so as to reciprocally move on a transparent member is provided. A cleaning process is performed in accordance with an instruction on a number of times of movement of the movement member.

9 Claims, 14 Drawing Sheets

CLEANING TRANSPARENT MEMBER PROVIDED ON IMAGE FORMING APPARATUS TO REDUCE FOREIGN MATTER

CROSS-REFERENCE TO RELATED APPLICATIONS

This application is a Continuation of International Patent Application No. PCT/JP2019/006594, filed Feb. 21, 2019, which claims the benefit of Japanese Patent Application No. 2018-038850, filed Mar. 5, 2018, both of which are hereby incorporated by reference herein in their entirety.

BACKGROUND OF THE INVENTION

Field of the Invention

The present invention relates to an image forming apparatus, such as an electrophotographic copying machine and a laser beam printer, that forms an image on a printing medium by using an electrophotographic method.

Background Art

Hitherto, an image forming apparatus that employs an electrophotographic method is provided with an optical scanning device. The optical scanning device forms an electrostatic latent image by applying light to the surface of an electrically charged photosensitive member. The optical scanning device includes optical system components such as a light source and a mirror, a case that covers the optical system components, and an opening through which a laser beam is emitted from the light source to the outside of the case. The opening is closed by a transparent member that allows light to pass therethrough in order to prevent entry of foreign matter, such as toner and dust, into the case.

When foreign matter, such as toner and dust, adheres to the transparent member, there have been concerns that a laser beam that is emitted through the opening is cut off by the foreign matter to change in optical properties and, as a result, the quality of an image to be formed decreases.

For such inconvenience, PTL 1 describes a configuration that performs a cleaning process of removing foreign matter adhering to transparent members with the use of cleaning members by moving the cleaning members while the cleaning members are in contact with the transparent members. PTL 1 also describes a configuration that periodically performs a cleaning process of reciprocating the cleaning members along the longitudinal directions of the transparent members by rotating a wind-up motor in forward and reverse directions in a single cleaning process, for example, each time about 10,000 sheets of paper are printed.

However, depending on the condition of the image forming apparatus, foreign matter on the transparent members may be difficult to remove. When, for example, condensation occurs inside the image forming apparatus because of a change in the temperature of an environment in which the image forming apparatus is installed, foreign matter may be fixedly stuck to the transparent members because of moisture caused by the condensation or other cases.

In this way, when foreign matter on the transparent members becomes difficult to remove, there are concerns that the foreign matter is not removed only by reciprocating the cleaning members once. For this reason, there are concerns that a laser beam that is emitted through the opening is cut off by residual foreign matter and, as a result, the quality of an image decreases. A typical configuration for achieving the above object is an image forming apparatus.

CITATION LIST

Patent Literature

PTL 1: Japanese Patent Laid-Open No. 2016-031467

SUMMARY OF THE INVENTION

The image forming apparatus includes a photosensitive member and an optical scanning device provided with a transparent member that allows a laser beam, used to scan the photosensitive member, to pass through the transparent member to an outside, the image forming apparatus including an image forming unit configured to form an image on a printing medium by developing, by using toner, an electrostatic latent image to be formed on the photosensitive member as a result of scanning the photosensitive member with the laser beam and then transferring the toner image onto the printing medium. The image forming apparatus includes a cleaning mechanism configured to clean the transparent member, the cleaning mechanism including a cleaning member that contacts with the transparent member and a movement member configured to move the cleaning member along a direction in which a laser beam is scanned, a user interface configured to accept an instruction on a number of times the movement member moves the cleaning member on the transparent member, and a controller circuitry configured to cause the movement member to reciprocate the number of times based on the instruction accepted by the user interface.

Further features of the present invention will become apparent from the following description of exemplary embodiments with reference to the attached drawings.

DESCRIPTION OF THE EMBODIMENTS

Hereinafter, embodiments of the present invention will be described with reference to the drawings. The dimensions, materials, shapes, relative arrangements, and the like of components that will be described below are not intended to limit the scope of the invention only thereto unless otherwise specified.

First Embodiment

Figure 1:
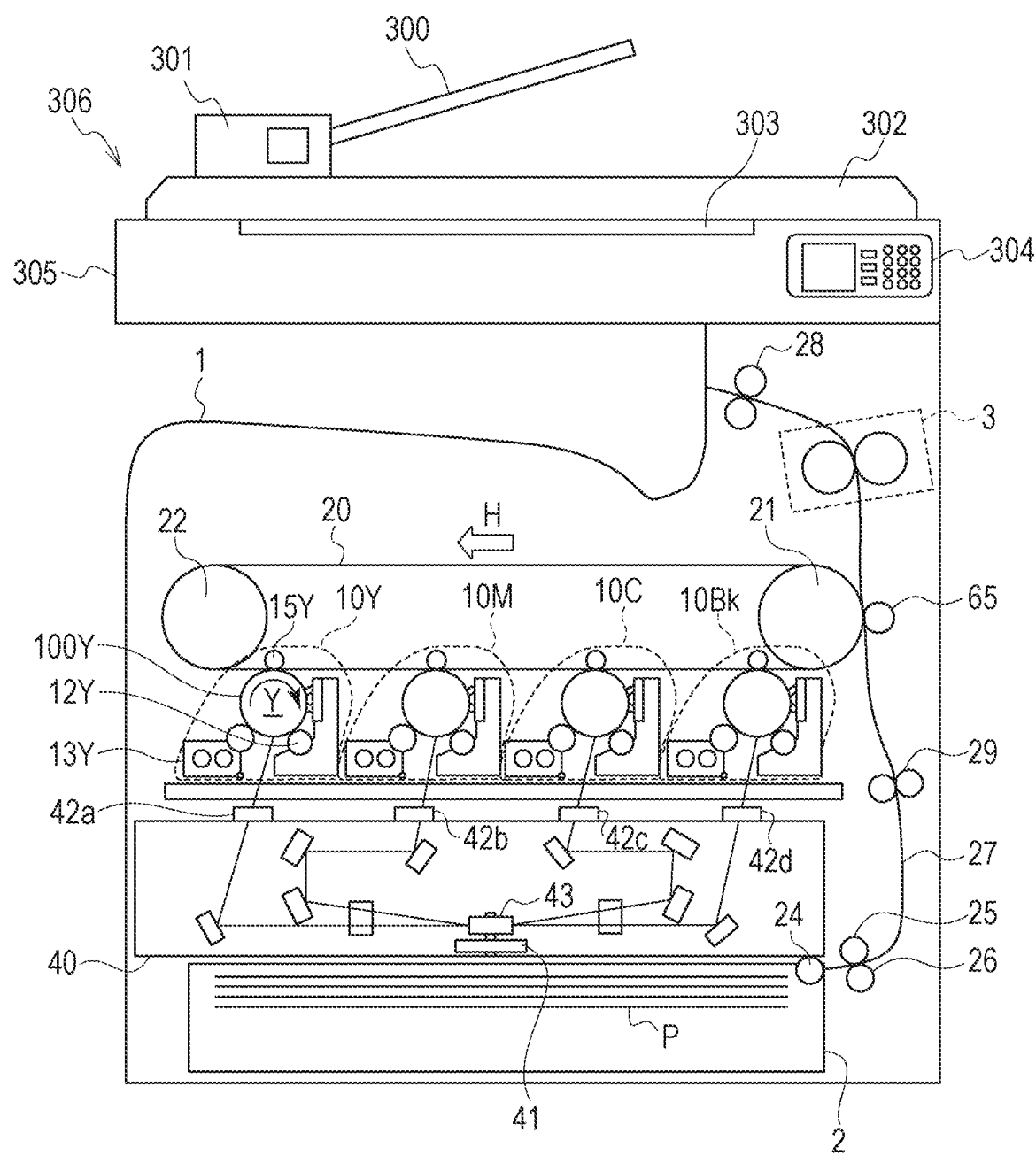
FIG. 1 is a schematic cross-sectional view of an image forming apparatus.

FIG. 1 is a schematic cross-sectional view of an image forming apparatus 1 in the present embodiment. As shown in FIG. 1, the image forming apparatus 1 in the present embodiment is a tandem type color laser beam printer including four image forming parts 10Y, 10M, 10C, 10Bk that respectively form toner images of yellow (Y), magenta (M), cyan (C), and black (Bk) colors.

The image forming apparatus 1 in the present embodiment includes a reader 306 at the top of a main body 1A of the apparatus. The reader 306 includes an original conveying device 301 that automatically conveys an original, and an original reading device 305 that reads an image on a conveyed original or the like.

The original conveying device 301 includes a stack tray 300 on which an original is set, and an output tray 302 to which an original is discharged. The original conveying device 301 conveys one by one originals placed on the stack tray 300 to an original reading position on a glass 303. An original conveyed onto the glass 303 is read by a scanner (not shown), such as a CCD and a CIS provided inside the original reading device 305. After that, the original conveying device 301 further conveys the original and discharges the original onto the output tray 302.

The original conveying device 301 is openable and closable relative to the original reading device 305. An operator is enabled to open the original conveying device 301 and place an original on the glass 303. The original reading device 305 applies light from a light source to an original conveyed onto the glass 303 by the original conveying device 301, an original placed on the glass 303, or the like, receives reflected light from the original with a light receiving sensor, and converts the received light to electrical signals. Electrical signals of red (r), green (g), and blue (b) components converted here are output to a control section such as a CPU 82 (described later).

As shown in FIG. 1, the image forming apparatus 1 in the present embodiment includes an operating unit 304. The operating unit 304 includes, for example, an operating panel made by stacking a liquid crystal display-type display panel and a resistive-type or capacitive-type touch panel on top of each other.

Therefore, the operating unit 304 is configured to enable an operator to perform an operation via the touch panel in accordance with display on the display panel. An operator is enabled to set or perform the timing of performing an image forming operation or the timing of performing cleaning via the operating unit 304.

The operating unit 304 has a start key that is depressed when an image forming operation is started, a stop key that is depressed when an image forming operation is stopped, a numeric keypad, and the like. The numeric keypad is a keypad that is operated when a numeric value is input, for example, the number of sheets of paper for image formation is set. In the image forming apparatus of the present embodiment, the start key, the stop key, and the numeric keypad are provided on the operating unit 304 as hard keys. Alternatively, these keys may be displayed on the display panel as soft keys.

The image forming apparatus 1 includes an intermediate transfer belt 20 on which toner images formed by the image forming parts 10Y, 10M, 10C, 10Bk are transferred. The image forming apparatus 1 is configured to transfer toner images superimposed from the respective image forming parts 10 on the intermediate transfer belt 20 to a sheet P that is a printing medium to form a color image on the sheet. In the present invention, a printing medium not only includes paper that is used in general printing but also widely includes cloth, plastic, film, and the like.

The image forming parts 10Y, 10M, 10C, 10Bk are configured substantially the same except that the color of toner that is used in each image forming part is different. Hereinafter, the image forming part 10Y will be described, for example, as the image forming part 10, and the overlap description of the image forming parts 10M, 10C, 10Bk is omitted.

The image forming part 10 includes a photosensitive member 100, a charging roller 12 that electrically charges the photosensitive member 100 with a uniform background potential, a developing machine 13 serving as developing device to form a toner image by developing an electrostatic latent image that is formed on the photosensitive member 100 by an optical scanning device 40 (described later), and a primary transfer roller 15 that transfers the formed toner image onto the intermediate transfer belt 20. The primary transfer roller 15 forms a primary transfer portion with the photosensitive member 100 via the intermediate transfer belt 20 and transfers a toner image formed on the photosensitive member 100 onto the intermediate transfer belt 20 by application of a predetermined transfer bias.

The intermediate transfer belt 20 is formed in an endless shape and wound to span between a first belt transfer roller 21 and a second belt transfer roller 22. A toner image formed by each image forming part 10 is transferred to the intermediate transfer belt 20 while the intermediate transfer belt 20 is rotated in an arrow H direction. The four image forming parts 10Y, 10M, 10C, 10Bk are arranged in parallel vertically below the intermediate transfer belt 20 and each transfer a toner image formed in accordance with image information of an associated color to the intermediate transfer belt 20. An image forming process of each color by the associated image forming part 10 is performed at the timing of superimposing a toner image onto an upstream-side toner images primarily transferred onto the intermediate transfer belt 20. As a result, four toner images are formed on the intermediate transfer belt 20 so as to be superimposed on top of each other.

The first belt transfer roller 21 is in press-contact with a secondary transfer roller 65 via the intermediate transfer belt 20 and forms a secondary transfer portion for transferring toner images onto a sheet P with the secondary transfer roller 65 via the intermediate transfer belt 20. When a sheet P is inserted into the secondary transfer portion, toner images are transferred from the intermediate transfer belt 20. Residual toner remaining on the surface of the intermediate transfer belt 20 is collected by a cleaning device (not shown).

The image forming parts 10 of colors are arranged in order of the image forming part 10Y that forms a yellow toner image, the image forming part 10M that forms a magenta toner image, the image forming part 10C that forms a cyan toner image, and the image forming part 10Bk that forms a black toner image from the upstream side relative to the secondary transfer portion in the rotation direction (arrow H direction) of the intermediate transfer belt 20.

The optical scanning device 40 is provided vertically below the image forming parts 10. The optical scanning device 40 forms an electrostatic latent image based on image information to be formed on each photosensitive member 100 by scanning the photosensitive member 100 with a laser beam.

The optical scanning device 40 includes four semiconductor lasers (not shown) each emit a laser beam modulated in accordance with image information of an associated one of colors. The optical scanning device 40 includes a motor unit 41, and a rotating polygon mirror 43 that is rotated at a high speed by the motor unit 41 to deflect a laser beam emitted from each of the semiconductor lasers so as to scan along a rotation axis direction of the associated photosensitive member 100. Laser beams deflected by the rotating polygon mirror 43 each are guided to an optical member disposed inside the optical scanning device 40, and emitted to an outside from the inside of the optical scanning device 40 via an associated one of transparent members 42a to 42d respectively covering openings provided at the top of the optical scanning device 40, and then expose the associated photosensitive member 100.

On the other hand, sheets P are accommodated in a feeding cassette 2 disposed at the bottom of the image forming apparatus 1. Sheets P are fed by a pick-up roller 24 to a separation nip part made up of a feed roller 25 and a retard roller 26. The retard roller 26 is driven so as to rotate in a reverse direction when multiple sheets P are fed by the pick-up roller 24, and conveys sheets P one by one to a downstream side to prevent feeding of multiple sheets P. Each sheet P conveyed one by one by the feed roller 25 and the retard roller 26 is conveyed to a feeding path 27 extending substantially vertically along the right side surface of the image forming apparatus 1.

Then, the sheet P is conveyed through the feeding path 27 vertically from the lower side of the image forming apparatus 1 toward the upper side and conveyed to registration rollers 29. The registration rollers 29 once stop the sheet P to be conveyed and corrects an inclination of the sheet. After that, the registration rollers 29 convey the sheet P to the secondary transfer portion in synchronization with the timing at which toner images formed on the intermediate transfer belt 20 are conveyed to the secondary transfer portion. After that, the sheet P on which the toner images have been transferred at the secondary transfer portion is conveyed to a fuser 3 and heated under pressure by the fuser 3 to fuse the toner images on the sheet P. The sheet P on which the toner images have been fused is discharged by discharge rollers 28 to the output tray provided outside the image forming apparatus 1 at the top of the main body of the image forming apparatus 1.

In this way, with the configuration in which the image forming parts 10 are provided above the optical scanning device 40 inside the main body of the image forming apparatus 1, foreign matter, such as toner, paper powder and dust, may drop with an image forming operation onto the transparent members 42a to 42d provided at the top of the optical scanning device 40. In this case, laser beams that are emitted to the photosensitive members 100 via the transparent members 42a to 42d are cut off by the foreign matter.

Therefore, the quality of an image may decrease as a result of a change in optical properties due to the foreign matter.

Figure 2:
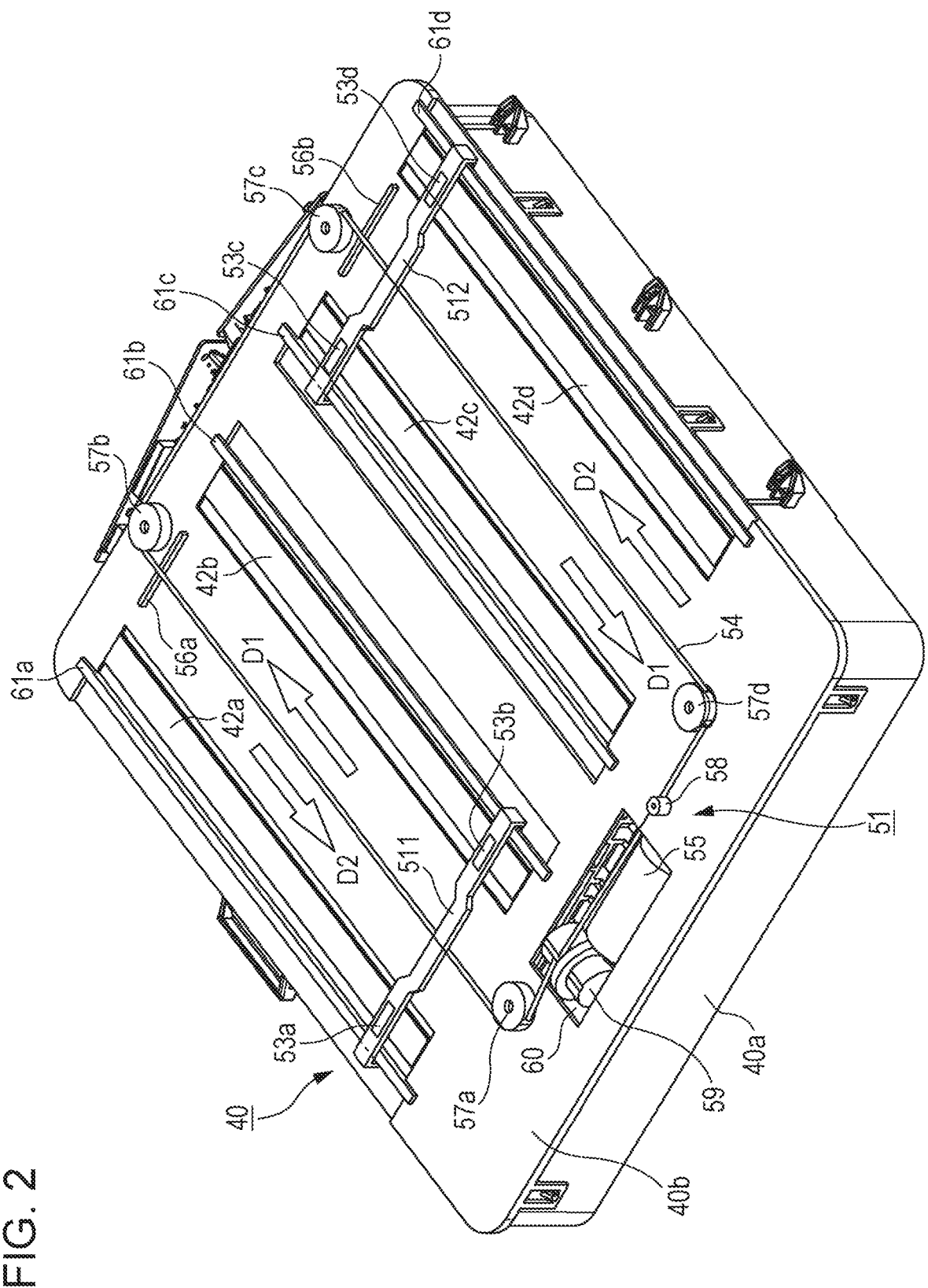
FIG. 2 is a perspective view of an optical scanning device.
Figure 3:
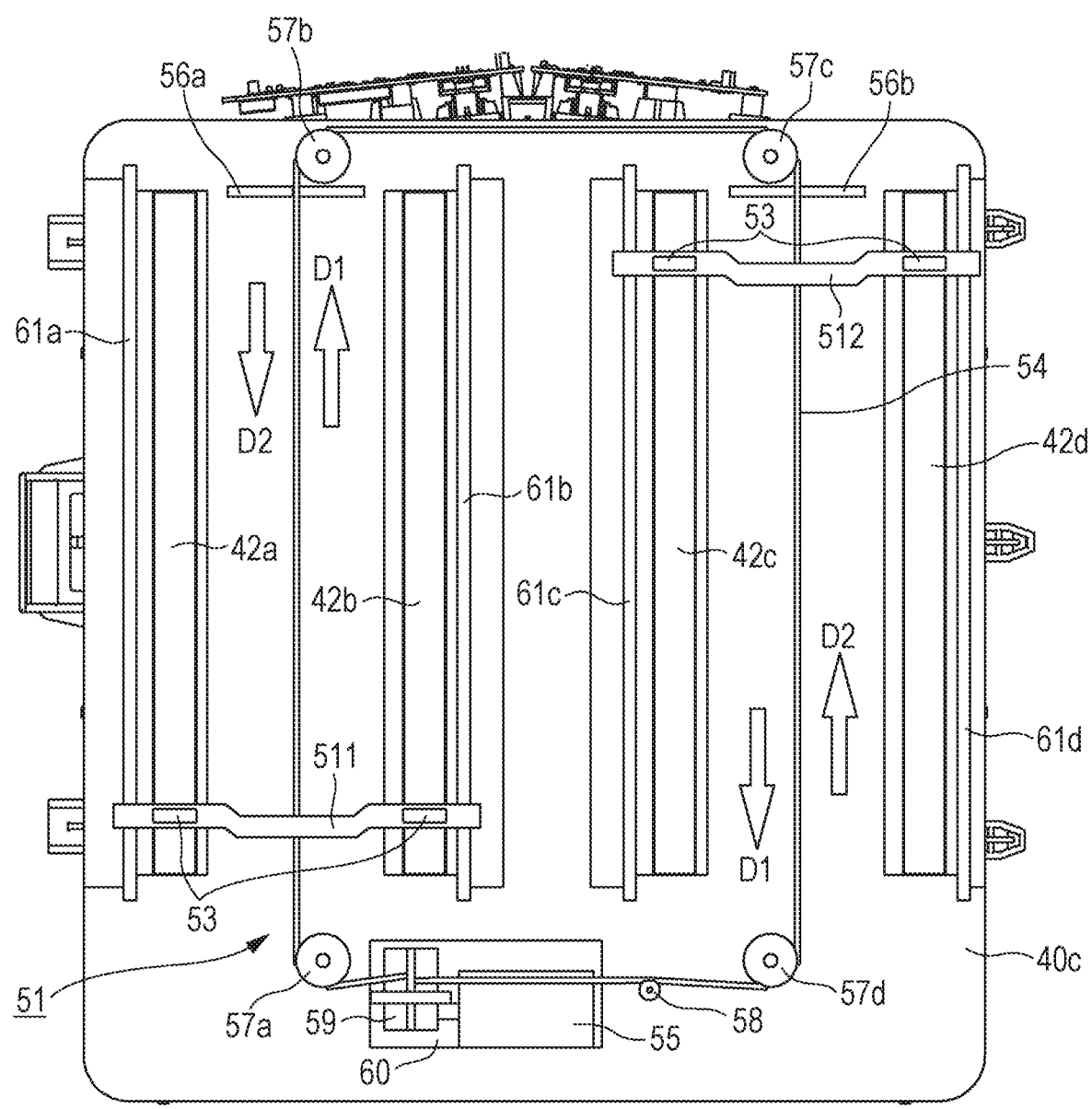
FIG. 3 is a top view of the optical scanning device.

In the present embodiment, the optical scanning device 40 includes a cleaning mechanism 51 for cleaning the transparent members 42a to 42d. Hereinafter, the optical scanning device 40 and the cleaning mechanism 51 provided in the optical scanning device 40 will be described in detail. FIG. 2 is a perspective view showing the overall optical scanning device 40. FIG. 3 is a top view of the optical scanning device 40.

As shown in FIG. 2 and FIG. 3, the optical scanning device 40 includes an accommodation part 40a that accommodates the above-described motor unit 41 and the rotating polygon mirror 43, and a cover part 40b attached to the accommodation part 40a to cover the top of the accommodation part 40a. The accommodation part 40a and the cover part 40b make up the case of the optical scanning device 40.

The cover part 40b has four openings through which laser beams pass in association with the photosensitive members 100 of the respective colors. Each opening has a rectangular shape and is long in the rotation axis direction of an associated one of the photosensitive members 100. The openings are formed so as to extend parallel to one another in the longitudinal directions.

The openings are respectively closed by the transparent members 42a to 42d each formed in a rectangular shape. The four transparent members 42a to 42d are provided as well as the openings and are attached to the cover part 40b so as to extend parallel to one another in the longitudinal directions.

The longitudinal directions of the transparent members 42a to 42d are substantially equal to the scanning directions of laser beams that are emitted from the optical scanning device 40. In the present embodiment, the longitudinal directions of the transparent members 42a to 42d are substantially equal to the rotation axis directions of the photosensitive members 100.

The transparent members 42a to 42d are provided to prevent entry of foreign matter, such as toner, dust, and paper powder, into the optical scanning device 40, and prevent a decrease in image quality due to adhesion of foreign matter to the semiconductor lasers, the mirror, the rotating polygon mirror 43, or the like.

The transparent members 42a to 42d are formed from, for example, clear members, such as glass, and are capable of emitting laser beams that are emitted by the semiconductor lasers inside the accommodation part 40a to the photosensitive members 100. In the present embodiment, the sizes of the transparent members 42a to 42d are set so as to be greater than the openings of the openings, and the transparent members 42a to 42d are configured to overlappingly cover the openings. By bonding portions where the transparent members 42a to 42d overlap relative to the openings, the transparent members 42a to 42d are fixed to the cover part 40b.

In this way, the optical scanning device 40 is covered with the cover part 40b and the transparent members 42a to 42d, so the optical scanning device 40 is configured such that foreign matter, such as toner, paper powder, and dust, does not enter the optical scanning device 40. By fixedly bonding the transparent members 42a to 42d larger than the openings onto the cover part 40b, entry of foreign matter, such as toner, paper powder, and dust, that drops from the upper side of the optical scanning device 40 into the optical scanning device 40 via gaps between the transparent members 42a to 42d and the openings is prevented.

In the present embodiment, the cleaning mechanism 51 is provided to perform a cleaning process of cleaning foreign matter that drops onto the top surface of the optical scanning device 40 (the top surfaces of the transparent members 42a to 42*d*) from above. The cleaning mechanism 51 is attached to a surface side facing the image forming parts 10 on the cover part 40*b* of the optical scanning device 40.

The cleaning mechanism 51 includes cleaning members 53*a* to 53*d* for respectively cleaning the top surfaces of the transparent members 42*a* to 42*d* (the outside surface of the optical scanning device 40), and a first cleaning holder 511 and a second cleaning holder 512 that hold the cleaning members 53*a* to 53*d* to move the cleaning members 53*a* to 53*d* on the transparent members 42*a* to 42*d*. The first cleaning holder 511 and the second cleaning holder 512 each are an example of the movement member and an example of the holding member.

Each of the first cleaning holder 511 and the second cleaning holder 512 spans between the adjacent two transparent members 42, extends in a direction perpendicular to a direction in which the transparent members 42 extend, and has two of the cleaning members 53. The number of the cleaning members 53 held by each of the first cleaning holder 511 and the second cleaning holder 512 corresponds to the number of the associated transparent members 42.

In other words, the first cleaning holder 511 is disposed so as to span between the transparent members 42*a*, 42*b* and holds the cleaning member 53*a* that cleans the top surface of the transparent member 42*a* and the cleaning member 53*b* that cleans the top surface of the transparent member 42*b*. The second cleaning holder 512 is disposed so as to span between the transparent members 42*c*, 42*d* and holds the cleaning member 53*b* that cleans the top surface of the transparent member 42*c* and the cleaning member 53*d* that cleans the top surface of the transparent member 42*d*.

The cleaning members 53*a* to 53*d* are made from, for example, silicon rubber, non-woven fabric, or the like and are capable of removing foreign matter on the transparent members 42 by moving in contact with the top surfaces of the transparent members 42 with movement of the first cleaning holder 511 and the second cleaning holder 512, and are capable of cleaning on the transparent members 42.

The first cleaning holder 511 is coupled to a wire 54 at its center portion and is configured to hold the cleaning members 53*a*, 53*b* on both sides of the wire 54. The second cleaning holder 512 is coupled to the wire 54 at its center portion and is configured to hold the cleaning members 53*c*, 53*d* on both sides of the wire 54. Therefore, the wire 54 is placed in a tensioned state so as to pass between the transparent members 42*a*, 42*b* and between the transparent members 42*c*, 42*d*.

The wire 54 is annularly placed in a tensioned state above the cover part 40*b* by four tension pulleys 57*a* to 57*d* rotatably held by the cover part 40*b*, a tension adjustment pulley 58, and a wind-up drum 59. The wire 54 is tensioned by the tension pulleys 57*a* to 57*d* in a state where the length is adjusted by being wound up by the wind-up drum 59 a predetermined number of times at the time of assembling the apparatus. At this time, the four tension pulleys 57*a* to 57*d* are provided such that the wire 54 passes between the transparent members 42*a*, 42*b* and between the transparent members 42*c*, 42*d*, as described above.

Since the tension of the wire 54 is adjusted by the tension adjustment pulley 58 provided between the tension pulleys 57*a*, 57*d*, the wire 54 is disposed in a tensioned state without a slack among the tension pulleys 57, the tension adjustment pulley 58, and the wind-up drum 59. Thus, by placing the wire 54 in a tensioned state, the wire 54 is enabled to smoothly run annularly.

In the present embodiment, the tension adjustment pulley 58 is provided between the tension pulleys 57*a*, 57*d*; however, the position is not limited to this position as long as it is possible to adjust the tension of the wire 54 tensioned among the tension pulleys 57*a* to 57*d*.

In this way, in the present embodiment, the first cleaning holder 511 is provided with the cleaning members 53*a*, 53*b*, and the second cleaning holder 512 is provided with the cleaning members 53*c*, 53*d*. In contrast, when a single cleaning holder holds a single cleaning member, cleaning holders need to be provided in correspondence with the number of transparent members, and the length of wire by which the cleaning holders are placed in a tensioned state extends. Therefore, in the present embodiment, in comparison with the configuration in which a single cleaning holder holds a single cleaning member, the number of cleaning holders is reduced, and the length of the wire 54 is shortened, so the top surfaces of the transparent members 42*a* to 42*d* are cleaned with a further simple configuration.

The wind-up drum 59 is configured to be rotatable by being driven by a wind-up motor 55 serving as an actuator. Therefore, the wind-up drum 59 rotates with the rotation of the wind-up motor 55 to wind up the wire 54 to or draw the wire 54 from the wind-up drum 59. In this way, the wire 54 is wound up to or drawn from the wind-up drum 59, the wire 54 is enabled to annularly run above the cover part 40*b* in a state where the wire 54 is tensioned among the tension pulleys 57.

The wind-up motor 55 is configured to be rotatable in both forward and reverse directions. The wire 54 is enabled to change the running direction between arrow D1, D2 directions by changing the rotation direction of the wind-up motor 55. Therefore, the first cleaning holder 511 and the second cleaning holder 512 that are coupled to the wire 54 are movable in the arrow D1, D2 directions (the longitudinal directions of the transparent members 42) with running of the wire 54. The wire 54, the tension pulleys 57*a* to 57*d*, the tension adjustment pulley 58, the wind-up drum 59, and the wind-up motor 55 are an example of the movement member.

At this time, the wire 54 is placed annularly in a tensioned state, so, with movement of the wire 54, the first cleaning holder 511 and the second cleaning holder 512 are respectively configured to linearly move in opposite directions in the longitudinal directions of the transparent members 42*a* to 42*d*. The arrow D1 direction is an example of the first direction, and the arrow D2 direction is an example of the second direction.

The wind-up motor 55 and the wind-up drum 59 are provided in a recess 60 recessed from the top surface of the cover part 40*b*. With this configuration, it is possible to reduce the size of the optical scanning device 40 in the height direction. The recess 60 does not communicate with the inside of the optical scanning device 40, and is provided so that foreign matter does not enter the inside of the optical scanning device 40 also from the recess 60.

The cover part 40*b* has a first stopper 56*a* that restricts movement of the first cleaning holder 511 in the longitudinal directions of the transparent members 42*a*, 42*b* (the rotation axis directions of the photosensitive members 100). The cover part 40*b* has a second stopper 56*b* that restricts movement of the second cleaning holder 512 in the longitudinal directions of the transparent members 42*c*, 42*d* (the rotation axis directions of the photosensitive members 100).

The first stopper 56*a* and the second stopper 56*b* each are provided at one side in the longitudinal directions of the transparent members 42*a* to 42*d*. Therefore, when the first cleaning holder 511 and the second cleaning holder 512 move in the arrow D1 direction as a result of running of the wire 54 in the arrow D1 direction by the forward rotation of the wind-up motor 55, the first cleaning holder 511 contacts with the first stopper 56a at the time of reaching the end portions of the transparent members 42a, 42b in the arrow D1 direction.

Thus, movement of the first cleaning holder 511 in the arrow D1 direction is restricted by the first stopper 56a, so a load that acts on the wind-up motor 55 that is rotating the wind-up drum 59 to cause the wire 54 to run increases. By detecting the load with a current detecting section (described later), the fact that the first cleaning holder 511 has reached the first stopper 56a (the end portion in the arrow D1 direction) is detected.

When the fact that the first cleaning holder 511 has reached the first stopper 56a (the end portion in the arrow D1 direction) is detected, the rotation of the wind-up motor 55 is stopped. After that, by rotating the wind-up motor 55 in the reverse direction, the wire 54 is caused to run in the arrow D2 direction. With this configuration, the first cleaning holder 511 and the second cleaning holder 512 each move in the arrow D2 direction. After that, the second cleaning holder 512 contacts with the second stopper 56b at the time of reaching the end portions of the transparent members 42c, 42d in the arrow D2 direction.

Thus, movement of the second cleaning holder 512 in the arrow D2 direction is restricted by the second stopper 56b, so a load that acts on the wind-up motor 55 that is rotating the wind-up drum 59 to cause the wire 54 to run increases. By detecting the load with the current detecting section (described later), the fact that the second cleaning holder 512 has reached the second stopper 56b (the end portion in the arrow D2 direction) is detected.

When the fact that the second cleaning holder 512 has reached the second stopper 56b (the end portion in the arrow D2 direction) is detected, the rotation of the wind-up motor 55 is stopped, and the wind-up motor 55 is rotated in the forward direction to cause the wire 54 to run in the arrow D1 direction to move the first cleaning holder 511 and the second cleaning holder 512 in the arrow D1 direction.

In this way, in the present embodiment, reciprocating the first cleaning holder 511 and the second cleaning holder 512 above the transparent members 42a to 42d once is designed as a series of cleaning process. When the series of cleaning process completes, the wire 54 is caused to run by a predetermined distance in the arrow D2 direction to stop the operation of the first cleaning holder 511 at a position where the first cleaning holder 511 is not brought into contact with the first stopper 56a and the cleaning members 53 are not in contact with the surfaces of the transparent members 42.

In other words, the first cleaning holder 511 is located in a non-passage area where laser beams do not pass above the transparent members 42 between the end portions of the transparent members 42 and the first stopper 56a in the longitudinal directions of the transparent members 42. At this time, the second cleaning holder 512 stops the operation at a position where the second cleaning holder 512 is not brought into contact with the end portions of the transparent members 42 in the longitudinal directions, that is, a non-passage area where laser beams do not pass above the transparent members 42. The stop positions of the first cleaning holder 511 and the second cleaning holder 512 in the case where the series of cleaning process completes are normal stop positions and also cleaning start positions.

In the above-described series of cleaning process, the rotation of the wind-up motor 55 is stopped and then rotated in the forward direction when the second cleaning holder 512 has reached the second stopper 56b. Alternatively, the wind-up motor 55 may be configured to be rotated in the forward direction in response to the fact that the second cleaning holder 512 has reached the second stopper 56b.

In the present embodiment, the wire 54 is caused to run in the arrow D1 direction by rotating the wind-up motor 55 in the forward direction, and the wire 54 is caused to run in the arrow D2 direction by rotating the wind-up motor 55 in the reverse direction. Alternatively, the wire 54 may be caused to run in the arrow D2 direction by rotating the wind-up motor 55 in the forward direction, and the wire 54 may be caused to run in the arrow D1 direction by rotating the wind-up motor 55 in the reverse direction.

Figure 4:
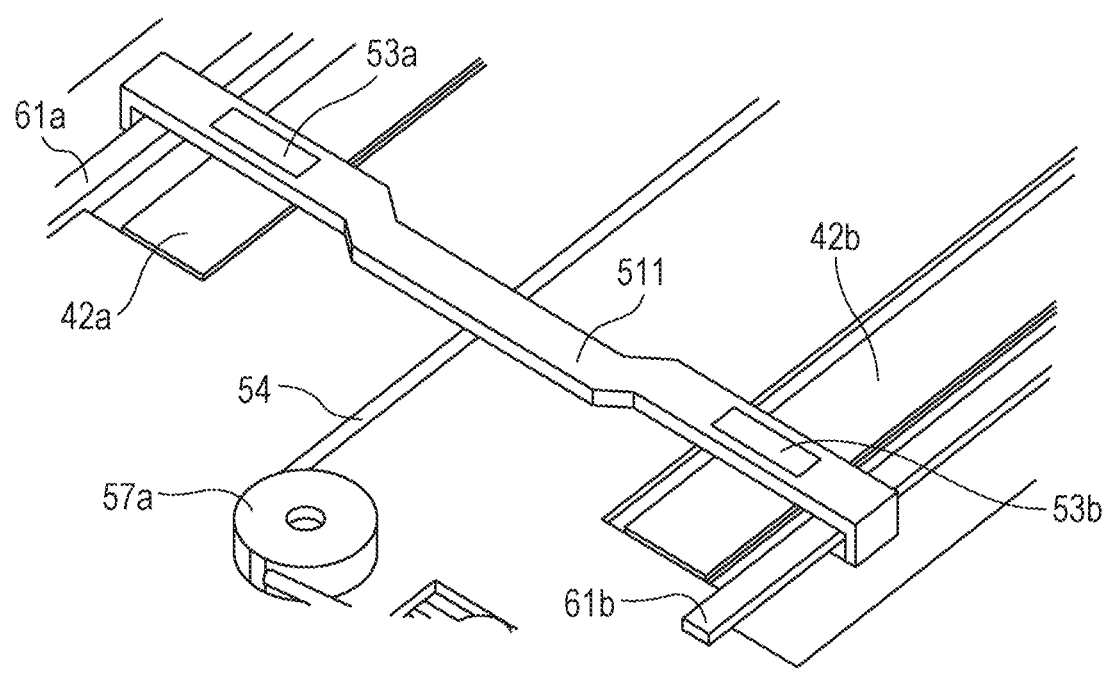
FIG. 4 is an enlarged perspective view of a first cleaning holder.

The cover part 40b has guide members 61a to 61d for guiding movement of the first cleaning holder 511 and the second cleaning holder 512. FIG. 4 is a partially perspective view showing a part near the first cleaning holder 511. Only the configuration of the first cleaning holder 511 will be described; however, in the present embodiment, a similar configuration is also applied to the second cleaning holder 512.

As shown in FIG. 4, both end portions of the first cleaning holder 511 are respectively engaged with the guide members 61a, 61b. FIG. 4 is an enlarged perspective view showing a part near the first cleaning holder 511. For the second cleaning holder 512 as well, as in the case of the configuration of the first cleaning holder 511, both end portions of the second cleaning holder 512 are respectively engaged with the guide members 61c, 61d.

This prevents the cleaning members 53a to 53d held by the first cleaning holder 511 and the second cleaning holder 512 from moving in a direction away from the transparent members 42a to 42d. In the present embodiment, the guide members 61a to 61d, the first stopper 56a, and the second stopper 56b are integrally formed from resin with the cover part 40b. Alternatively, the guide members 61a to 61d, the first stopper 56a, and the second stopper 56b may be formed separately from the cover part 40b.

As described above, in the present embodiment, in the normal cleaning process, the first cleaning holder 511 and the second cleaning holder 512 each are moved in the arrow D1 direction and then moved in the arrow D2 direction to cause the cleaning members 53a to 53d to slide and reciprocate on the top surfaces of the transparent members 42a to 42d once. However, there are concerns that, depending on the installation environment of the image forming apparatus 1, when, for example, condensation occurs inside the main body of the apparatus, moisture produced by the condensation may stick to foreign matter present on the transparent members 42a to 42d and, as a result, the foreign matter may not be completely removed only by reciprocating the cleaning members 53a to 53d on the transparent members 42a to 42d once. There are also concerns that, when cleaning performance decreases because of abrasion or the like of the cleaning members 53a to 53d, foreign matter may not be completely removed by reciprocating the cleaning member 53a to 53d on the transparent members 42a to 42d once.

Figure 5:
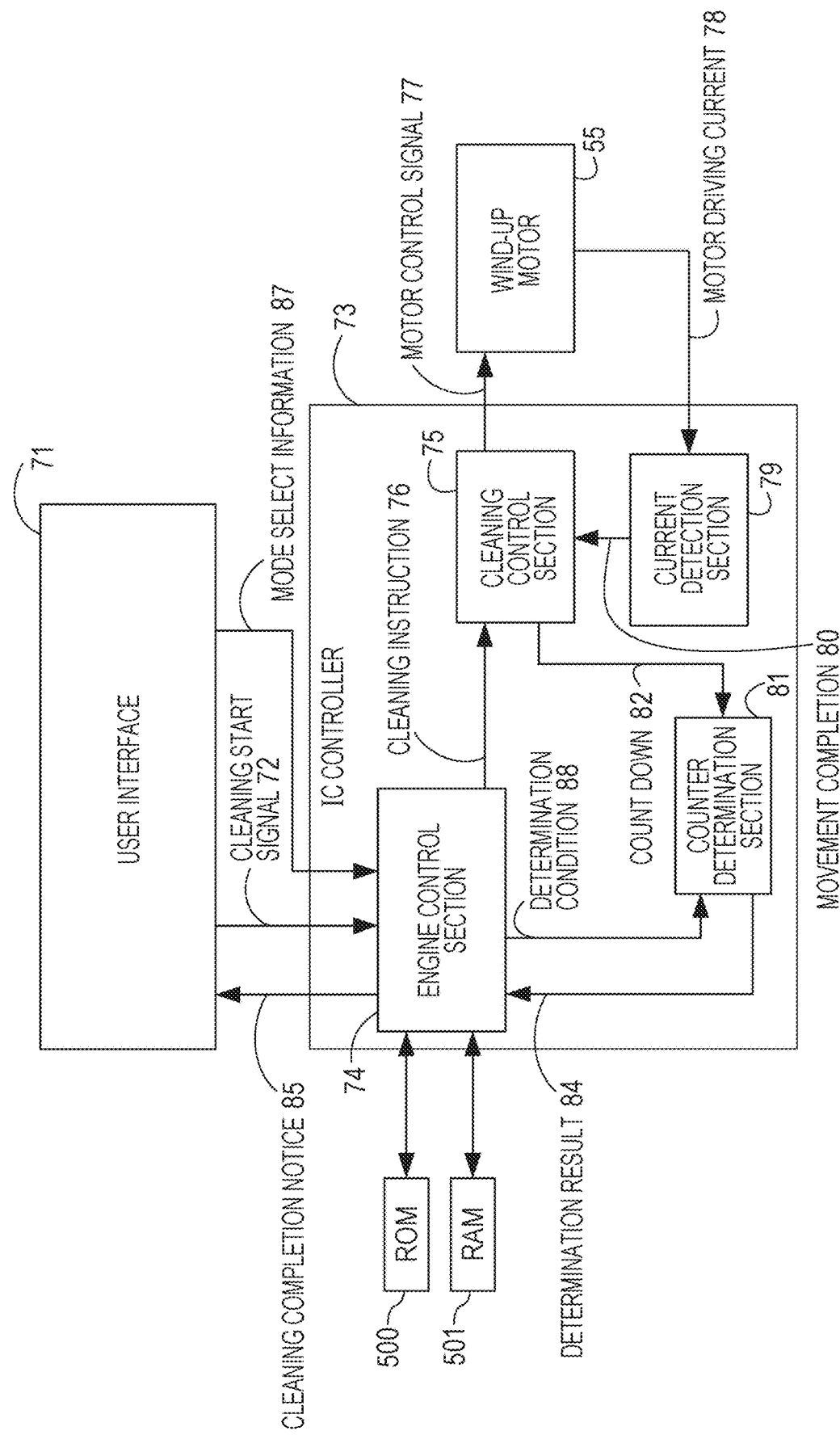
FIG. 5 is a block diagram showing a control configuration in a first embodiment.
Figure 6:
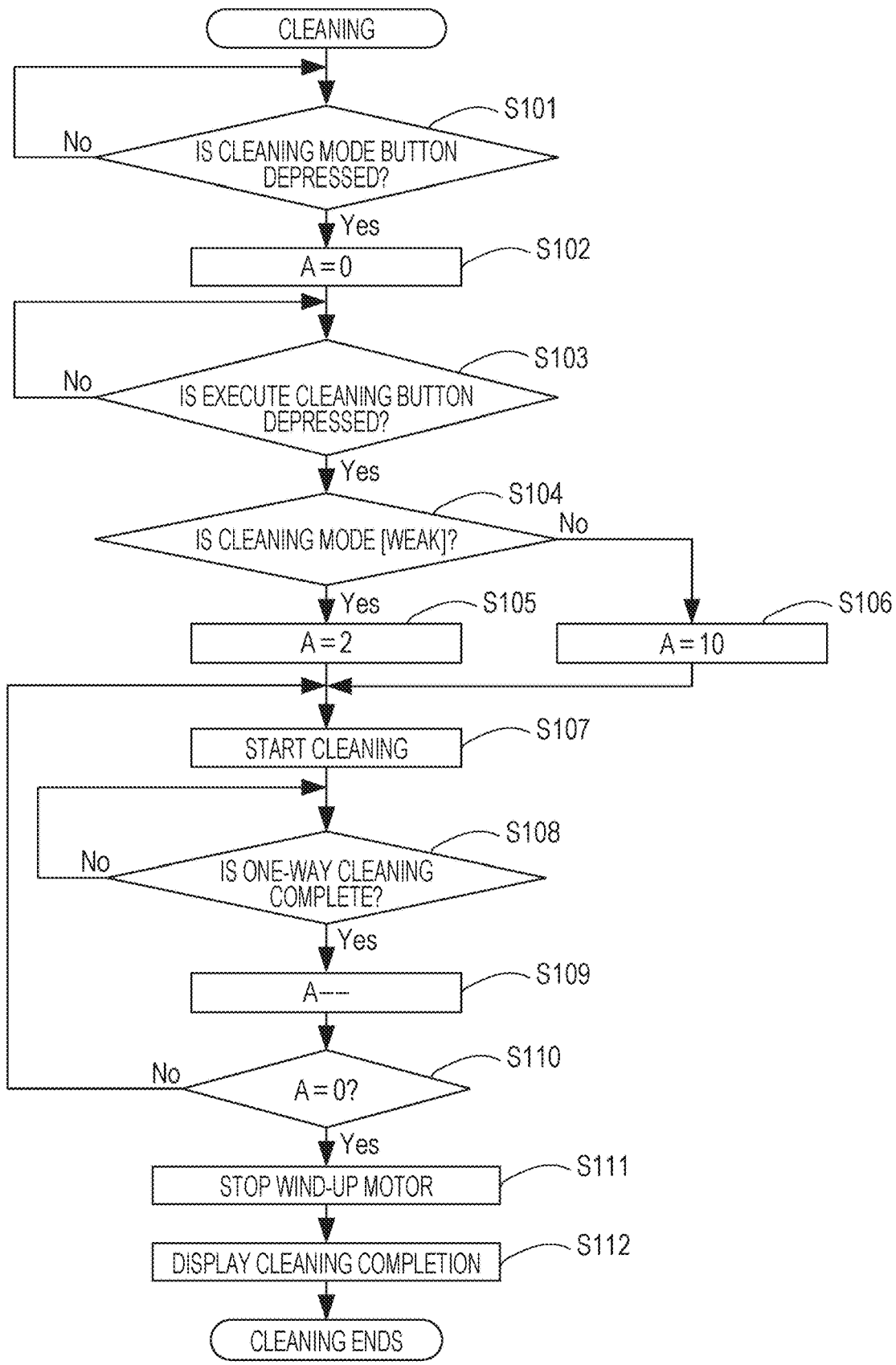
FIG. 6 is a flowchart showing a cleaning process in the first embodiment.

In the present embodiment, a mode that enables an operator to change the number of times of movement of the first cleaning holder 511 and the second cleaning holder 512 in the cleaning process by means of setting is provided. Hereinafter, the cleaning process in the present embodiment will be described. FIG. 5 is a control block diagram showing a control configuration for performing the cleaning process in the present embodiment. FIG. 6 is a flowchart showing the cleaning process in the present embodiment. In the present embodiment, a user or a maintenance person is referred to as operator.

As shown in FIG. 5, an IC controller 73 includes an engine control section 74, a cleaning control section 75 for controlling the wind-up motor 55, the current detecting section 79 that detects a driving current of the wind-up motor 55, and a counter determination section 81 that counts the number of cleaning times of the cleaning mechanism 51, as internal modules. The IC controller 73 is configured to control a user interface 71 and the wind-up motor 55 via the modules. Hereinafter, control of the cleaning process that is executed by the IC controller 73 by using the modules will be described. The IC controller 73 is a controller circuitry which may include one or more processors such as central processing units (CPUs), microprocessor units (MPUs), digital signal processors (DSPs), and/or field programmable gate arrays (FPGAs) or the like. The one or more processors execute a computer program stored in a memory (e.g. ROM 500) to implement various features of the IC controller 73. The user interface 71 may include an input device to accept user inputs and a display device to display information.

The IC controller 73 executes various control by reading out a firmware program stored in ROM 500 and a boot program for controlling the firmware program via the engine control section 74 and using RAM 501 as a working area and a temporary storage area for data. The IC controller 73 is an example of the controller circuitry.

The IC controller 73 is capable of acquiring setting information from an operator via the user interface 71 that is displayed on the operating unit 304 of the image forming apparatus 1 and inform the operator of various pieces of information. As described above, the operating unit 304 may be, for example, made by stacking a liquid crystal display-type display panel and a resistive-type or capacitive-type touch panel on top of each other.

Figure 7:
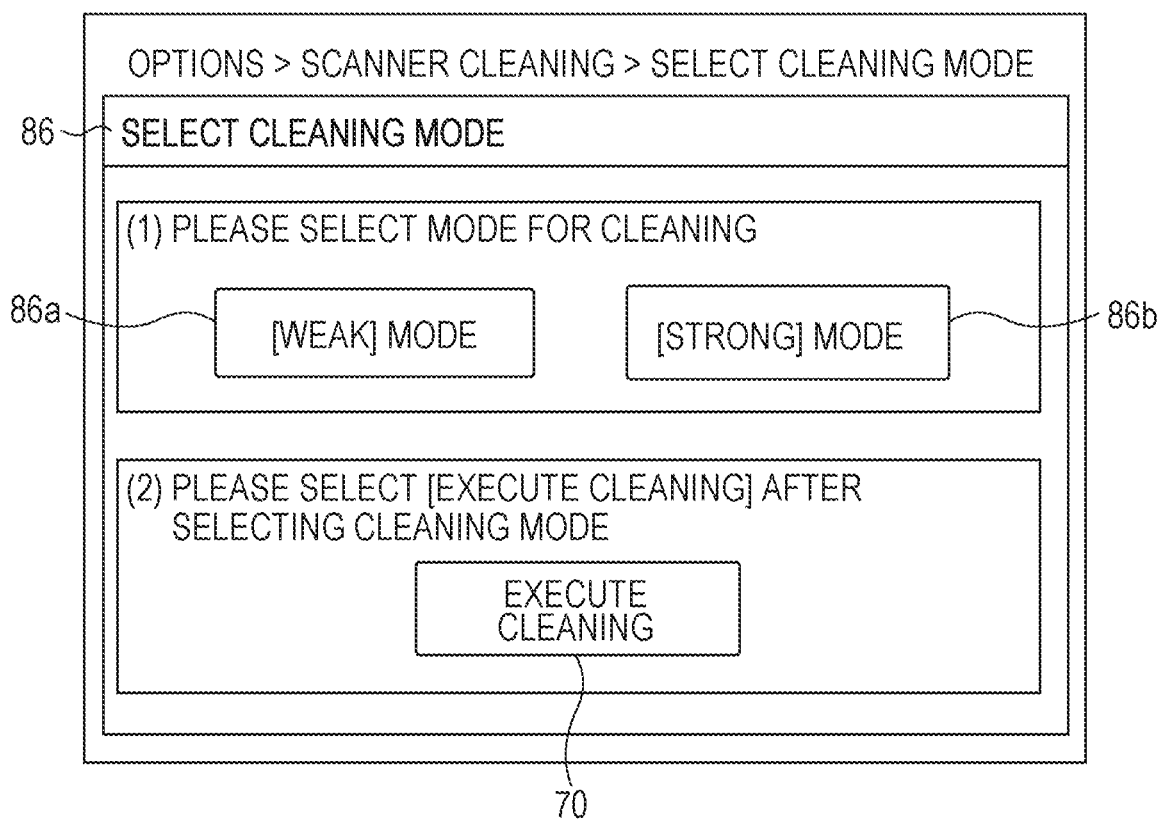
FIG. 7 is a view showing a user interface screen in the first embodiment.

The IC controller 73 displays the user interface 71 that allows an operator to make selection via the engine control section 74, and the operator makes input in accordance with the display. Thus, setting information is acquired from the operator. FIG. 7 shows an example of the user interface 71 in the present embodiment.

As shown in FIG. 7, the user interface 71 displays settings of a select cleaning mode 86 that enables an operator to select a cleaning mode and an execute cleaning key 70 that enables an operator to start the cleaning process. Various settings of the cleaning process are performed by an operator via the user interface 71. In the present embodiment, multiple cleaning modes having different strengths for the cleaning process are provided as cleaning modes, and an operator is enabled to select those modes.

A cleaning mode selected by an operator is output to the engine control section 74 in the IC controller 73 as mode select information 87, and, when the execute cleaning key 70 is selected, a cleaning start signal 72 is output to the engine control section 74 in the IC controller 73. Thus, the IC controller 73 accepts an instruction from an operator via the user interface 71.

In the present embodiment, the strength of the cleaning process is configured to be selectable in accordance with a cleaning mode that is set by an operator via the user interface 71. For example, in the present embodiment, a weak mode and a strong mode of which the number of cleaning times (the number of times of reciprocation of the first cleaning holder 511 and the second cleaning holder 512) is greater than the weak mode are provided as the cleaning modes.

An operator is allowed to set a mode by operating a weak mode key 86a or a strong mode key 86b, which is displayed on the interface 71 as shown in FIG. 7. An operator is enabled to select the number of cleaning times (the number of times of reciprocation (movement in the arrow D1 direction and movement in the arrow D2 direction) of the first cleaning holder 511 and the second cleaning holder 512) in the cleaning process by setting the cleaning mode in this way.

Reciprocation of the first cleaning holder 511 and the second cleaning holder 512 means movement of the transparent members 42a to 42d from one end to the other end and movement from the other end to one end in the longitudinal directions.

The above-described first stopper 56a and second stopper 56b are provided so as to restrict areas of movement of the first cleaning holder 511 and the second cleaning holder 512 above the transparent members 42a to 42d.

In the longitudinal directions of the transparent members 42a to 42d, an area where a laser beam is actually emitted from the optical scanning device 40 is scanned is narrower than an area from one end to the other end of each of the transparent members 42a to 42d. Therefore, a minimum area of movement of the first cleaning holder 511 and the second cleaning holder 512 in the longitudinal directions of the transparent members 42a to 42d just needs to be an area where at least laser beams are scanned on the transparent members 42a to 42d. In this case, the positions where the first stopper 56a and the second stopper 56b are provided may be positions that enable the first cleaning holder 511 and the second cleaning holder 512 to move in at least an area where laser beams are scanned on the transparent members 42a to 42d.

A maximum area of movement of the first cleaning holder 511 and the second cleaning holder 512 in the longitudinal directions of the transparent members 42a to 42d may be, for example, an area from one end to the other end of the transparent members 42a to 42d. In this case, the positions where the first stopper 56a and the second stopper 56b are provided may be positions that enable the first cleaning holder 511 and the second cleaning holder 512 to move in an area from one end to the other end of the transparent members 42a to 42d. A maximum area of movement of the first cleaning holder 511 and the second cleaning holder 512 may be set to an area from one end and the other end of the transparent members 42a to 42d in the longitudinal directions to the top surface of the cover part 40b.

In this way, by setting a minimum area of movement of the first cleaning holder 511 and the second cleaning holder 512 to an area where laser beams are scanned, it is possible to remove foreign matter present in the scanning area of laser beams.

The IC controller 73 outputs a determination condition 88 to the counter determination section 81 in accordance with the mode select information 87 based on the cleaning mode set by an operator via the engine control section 74. The determination condition 88 includes data indicating the number of times of movement of the first cleaning holder 511 and the second cleaning holder 512 in a cleaning process. When the cleaning mode is selected by the operator, the IC controller 73 stores the number of time of movement for the cleaning mode in the RAM 501 in accordance with the mode select information 87. The IC controller 73 outputs the determination condition 88 in accordance with the number of times of movement, stored in the RAM 501. Thus, the IC controller 73 is capable of setting the number of times of movement in a cleaning operation based on a cleaning mode. In the present embodiment, cleaning number of times information 90 is stored in the RAM 501 provided outside the IC controller 73. Alternatively, the cleaning number of times information 90 may be stored in an internal storage area provided inside the IC controller 73.

In the present embodiment, for example, in the weak mode, the first cleaning holder 511 and the second cleaning holder 512 are controlled to reciprocate between one end to the other end of the transparent members 42a to 42d once. In the strong mode, the first cleaning holder 511 and the second cleaning holder 512 are controlled to perform a cleaning operation to reciprocate between one end to the other end of the transparent members 42a to 42d five times. The engine control section 74 outputs the determination condition 88 to the counter determination section 81 such that the determination condition 88 is set to two in the weak mode and the determination condition 88 is set to ten in the strong mode. A method of detecting movement of the first cleaning holder 511 and the second cleaning holder 512 will be described in detail later; however, in the present embodiment, movement in one direction in a reciprocation is counted as one, so the determination condition 88 for counting a single reciprocation is set to two.

When such a weak mode and a strong mode are provided, the number of times of movement of the first cleaning holder 511 and the second cleaning holder 512 is not limited to the above-described number of times and may be set as needed. For example, the number of times of movement may be set to two in the weak mode and the number of times of movement may be set to four times in the strong mode.

An operator is enabled to execute a cleaning process by selecting a cleaning mode on the user interface 71 as described above and then selecting the execute cleaning key 70 displayed on the user interface 71 as shown in FIG. 7. In the present embodiment, selecting a cleaning mode and selecting execute cleaning are accepted by an operator operating soft keys displayed on the touch panel; however, the configuration is not limited thereto. Selecting a cleaning mode and selecting execute cleaning may be performed by, for example, operating hard keys provided separately from the operating panel.

The IC controller 73 uses the engine control section 74 to receive the above-described mode select information 87 via the user interface 71 and, when receiving a cleaning start signal 72, outputs a cleaning instruction 76 to the cleaning control section 75.

The IC controller 73 outputs a motor control signal 77 to the wind-up motor 55 via the cleaning control section 75 to drive the wind-up motor 55 for rotation. On the other hand, in the cleaning process, a motor driving current 78 from the wind-up motor 55 is detected via the current detecting section 79.

The wind-up motor 55 is controlled at a constant voltage, and, when the first cleaning holder 511 or the second cleaning holder 512 is brought into contact with the first stopper 56a or the second stopper 56b, a driving current increases in response to an increase in load that acts on the wind-up motor 55.

Therefore, when a driving current detected by the current detecting section 79 is greater than a predetermined value, the IC controller 73 detects that the first cleaning holder 511 or the second cleaning holder 512 is brought into contact with the first stopper 56a or the second stopper 56b and movement in one direction from the end to the end of the transparent members 42a to 42d completes. In other words, completion of one-way cleaning in a reciprocation is detected. Therefore, the IC controller 73 outputs a signal indicating movement completion 80 to the cleaning control section 75 in response to detection of the fact that the driving current is greater than the predetermined value.

The predetermined value is a value greater than a driving current value that flows through the wind-up motor 55 while the first cleaning holder 511 or the second cleaning holder 512 is moving on the transparent members 42. In other words, the predetermined value is a value greater than a driving current value that is flowing through the wind-up motor 55 before the first cleaning holder 511 or the second cleaning holder 512 is brought into contact with the first stopper 56a or the second stopper 56b. The predetermined value is a value by which it is possible to detect that the first cleaning holder 511 or the second cleaning holder 512 is brought into contact with the first stopper 56a or the second stopper 56b, and is set to a value that does not include a current value that increases with other fluctuations, such as a failure of the motor. Determination as to completion of movement of the first cleaning holder 511 and the second cleaning holder 512 from one end to the other end in the longitudinal directions of the transparent members 42a to 42d may be performed by not making a comparison with the predetermined value but determining a variation in detected current value.

When the IC controller 73 determines that movement of the first cleaning holder 511 and the second cleaning holder 512 from one end to the other end in the longitudinal directions of the transparent members 42a to 42d completes, the IC controller 73 outputs a count down signal 82 to the counter determination section 81 via the cleaning control section 75.

The IC controller 73 uses the counter determination section 81 to count down the number of cleaning times each time the count down signal 82 is received by way of the determination condition 88 received from the engine control section 74 and output a determination result 84 to the engine control section 74. The counter determination section 81 counts down one from a numeric value set in the determination condition 88 each time the count down signal 82 is received, and outputs the determination result 84 to the engine control section 74.

At this time, the IC controller 73 determines via the engine control section 74 whether a value count down by the counter determination section 81 is zero and, when the determination result is zero, determines that the cleaning operation is complete; whereas, when the determination result is not zero, determines that the cleaning operation is not complete.

When it is determined that the cleaning operation is complete, the IC controller 73 stops the wind-up motor via the engine control section 74 and the cleaning control section 75 and outputs a cleaning completion notice 85 to the user interface 71. The user interface 71, in accordance with this, displays that the cleaning process is complete on the display (not shown) to inform the operator that the cleaning operation is complete. In contrast, when it is determined that the cleaning operation is not complete, the IC controller 73 outputs the cleaning instruction 76 to the cleaning control section 75 again and controls the wind-up motor 55 via the cleaning control section 75 to repeat the cleaning operation. The cleaning control section 75 is capable of controlling the first cleaning holder 511 and the second cleaning holder 512 so as to reciprocate by rotating the wind-up motor 55 in the forward and reverse directions.

In the present embodiment, the IC controller 73 incorporates the engine control section 74, the cleaning control section 75, the current detecting section 79, and the counter determination section 81; however, the configuration is not necessarily limited thereto. For example, modules different from the internal modules of the IC controller 73 described in the present embodiment may be used to implement control in the cleaning process that is executed by the IC controller 73 or may be configured to incorporate the ROM 500 or the RAM 501.

Next, control that is executed by the IC controller 73 in the cleaning process of the present embodiment will be described by using the flowchart of FIG. 6.

Initially, the IC controller 73 determines whether any cleaning mode, that is, the weak mode or the strong mode, is selected by the operator via the user interface 71 (S101).

When the cleaning mode is selected (Yes in S101), the IC controller 73 resets the count value of the number of cleaning times to zero (S102).

Subsequently, the IC controller 73 determines whether an instruction to execute cleaning has been accepted from the operator via the user interface 71 (S103). When an instruction to execute cleaning has been accepted (Yes in S103), the IC controller 73 determines which cleaning mode is selected by the operator in S101 (S104).

When the selected mode is the weak mode, the IC controller 73 sets the number of cleaning times A to two (S105). When the selected mode is the strong mode, the IC controller 73 sets the number of cleaning times A to ten (S106).

After that, the IC controller 73 drives the wind-up motor 55 for rotation to start reciprocation of the first cleaning holder 511 and the second cleaning holder 512 (S107). Thus, the cleaning operation is started by the cleaning mechanism 51. At this time, the motor control signal 77 output by the IC controller 73 to the wind-up motor 55 via the cleaning control section 75 includes a signal to control for rotating the wind-up motor 55 in the forward direction or in the reverse direction, and it is possible to control running of the wire 54 in the arrow D1, D2 directions.

Subsequently, the IC controller 73 determines in accordance with the detection result of the current detecting section 79 whether the driving current of the wind-up motor 55 has increased, and, in accordance with this determination, determines whether movement of the first cleaning holder 511 and the second cleaning holder 512 from one end to the other end of the transparent members 42*a* to 42*d* is complete (S108).

When movement of the first cleaning holder 511 and the second cleaning holder 512 from one end to the other end of the transparent members 42*a* to 42*d* is not complete (No in S108), the IC controller 73 continues driving the wind-up motor 55 for rotation to continue movement of the first cleaning holder 511 and the second cleaning holder 512. When movement of the first cleaning holder 511 and the second cleaning holder 512 from one end to the other end is complete (Yes in S108), the IC controller 73 counts down the count value by one from the number of cleaning times A set in S105 or S106 (S109).

After that, the IC controller 73 determines whether the result counted down from the count value in S109 is zero (S110). When the result counted down from the count value in S109 is not zero and it is determined that movement of the first cleaning holder 511 and the second cleaning holder 512 (cleaning operation) is not complete (No in S110), the process returns to S107, the IC controller 73 rotates the wind-up motor 55 in a direction reverse to the last rotation direction to start movement of the first cleaning holder 511 and the second cleaning holder 512 in the opposite direction.

When the result of S109 is zero and it is determined that all the cleaning operation of the first cleaning holder 511 and the second cleaning holder 512 is complete (Yes in S110), the IC controller 73 stops driving of the wind-up motor 55 (S111) and outputs the cleaning completion notice 85 to the user interface 71 (S112). Thus, completion of the cleaning operation is informed to the operator via the user interface 71, and the cleaning process in the flowchart of FIG. 6 ends.

In the present embodiment, the process of resetting the count value to zero before the start of the cleaning process is executed. Alternatively, a process of resetting to zero each time the cleaning process operation ends may be executed. A method of counting in the counter determination section 81 may be not a method of counting down but a method of counting up. In this case, it may be determined that the cleaning operation is complete when the count value becomes greater than or equal to the number of times of cleaning operation.

In the present embodiment, the cleaning modes include two types, that is, the weak mode and the strong mode. Alternatively, three or more cleaning modes may be provided. For example, three types of mode, that is, a weak mode, a medium mode, and a strong mode, may be provided.

In the present embodiment, in S101, the sequence of the cleaning process is executed in response to the fact that the operator selects any one of the cleaning modes. Alternatively, in S101, step from S102 may be executed in accordance with the fact that a select cleaning mode screen is displayed via the user interface 71. In other words, step from S102 may be executed when a setting mode for setting the cleaning operation is selected by the operator.

In the present embodiment, determination is performed by counting movement in one direction in a reciprocation as one. Alternatively, determination may be performed by counting a single reciprocation (movement in two directions) as one. In this case, by setting a value to be counted down from the count value in S109 of FIG. 6 to 0.5, even when determination is performed by counting a single reciprocation as one, it is possible to determine in S110 whether all the cleaning operation is complete.

The above-described embodiment illustrates a configuration in which a cleaning mode is selectable at the time when the operator provides an instruction to execute the cleaning process operation from the user interface at any timing; however, the embodiment is not limited thereto. For example, in an apparatus having multiple cleaning modes having different number of cleaning times, the embodiment may be configured as follows.

The image forming apparatus 1 may be an apparatus that is enabled to set a cleaning mode from the user interface 71 so as to automatically perform a first cleaning mode when a predetermined number of sheets of image forming operation is complete and perform a second cleaning mode greater in the number of cleaning times than the first cleaning mode when an instruction to execute the cleaning process operation is provided from the user interface 71 at any timing. Alternatively, the image forming apparatus 1 may be an apparatus that is enabled to set a cleaning mode from the user interface 71 so as to automatically perform a second cleaning mode when a predetermined number of sheets of image forming operation is complete and perform a first cleaning mode less in the number of cleaning times than the second cleaning mode when an instruction to execute the cleaning process operation is provided from the user interface 71 at any timing. Furthermore, the image forming apparatus 1 may enable an operator to optionally set a strong mode or a weak mode in advance from the user interface 71 as the cleaning mode that is automatically executed after a predetermined number of sheets of image formation is complete.

As described above, with a configuration in which multiple cleaning modes are provided and a cleaning mode is set as needed by an operator, even when condensation or the like occurs inside the image forming apparatus 1 and foreign matter that is difficult to remove only by reciprocating the cleaning members on the transparent members 42 once is present, it is possible to prevent residual foreign matter on the transparent members. Even when the cleaning performance of the cleaning members 53 decreases depending on the condition of the image forming apparatus 1, it is possible to prevent residual foreign matter on the transparent members by performing a cleaning operation multiple times. With this configuration, it is possible to suppress a decrease in image quality due to residual foreign matter on the transparent members.

Second Embodiment

Next, a second embodiment will be described. The second embodiment is similar to the first embodiment except that control of a cleaning process that uses the cleaning mechanism 51 is different, so like reference numerals denote the same components, and the description thereof is omitted.

Figure 8:
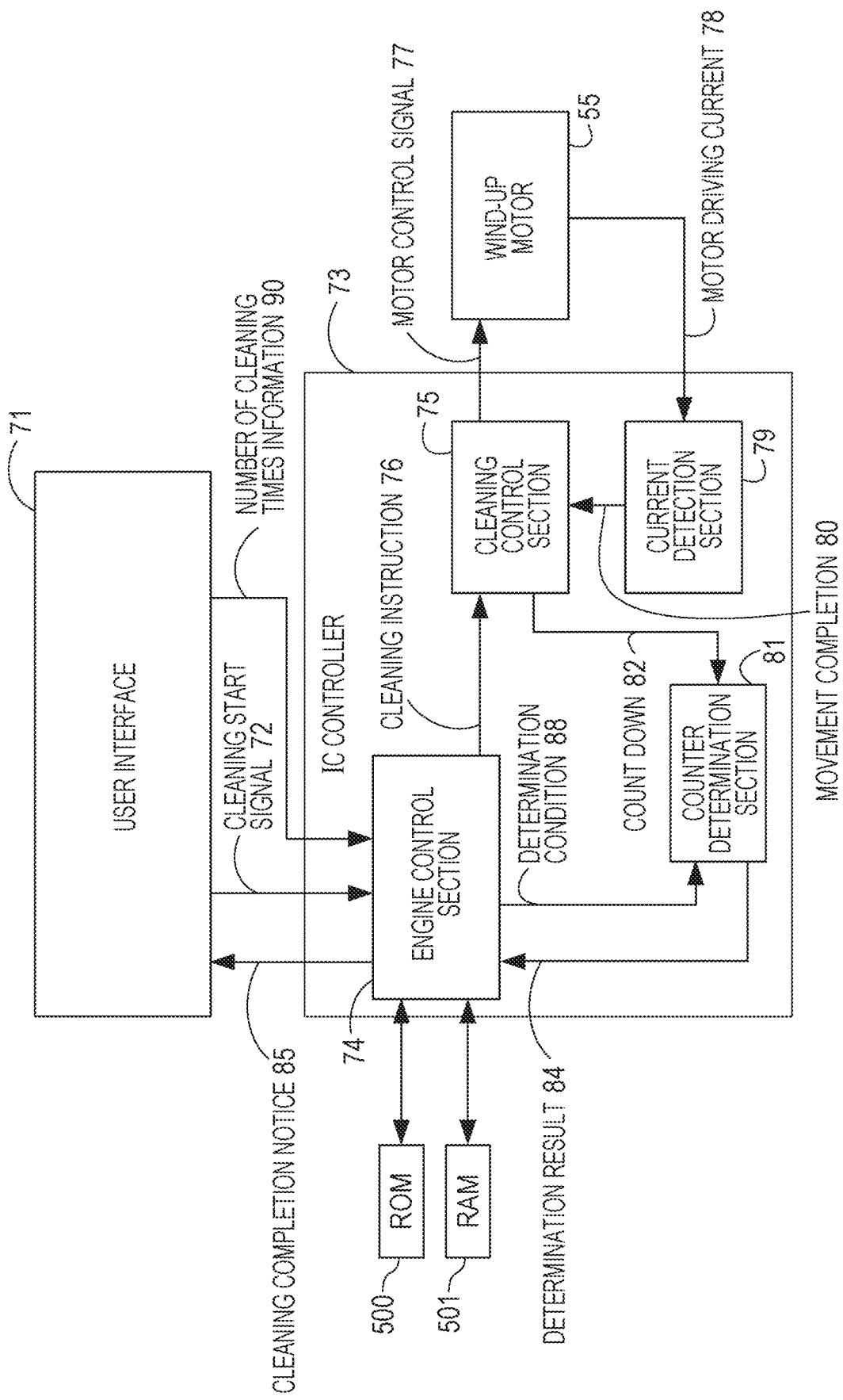
FIG. 8 is a block diagram showing a control configuration in a second embodiment.
Figure 9:
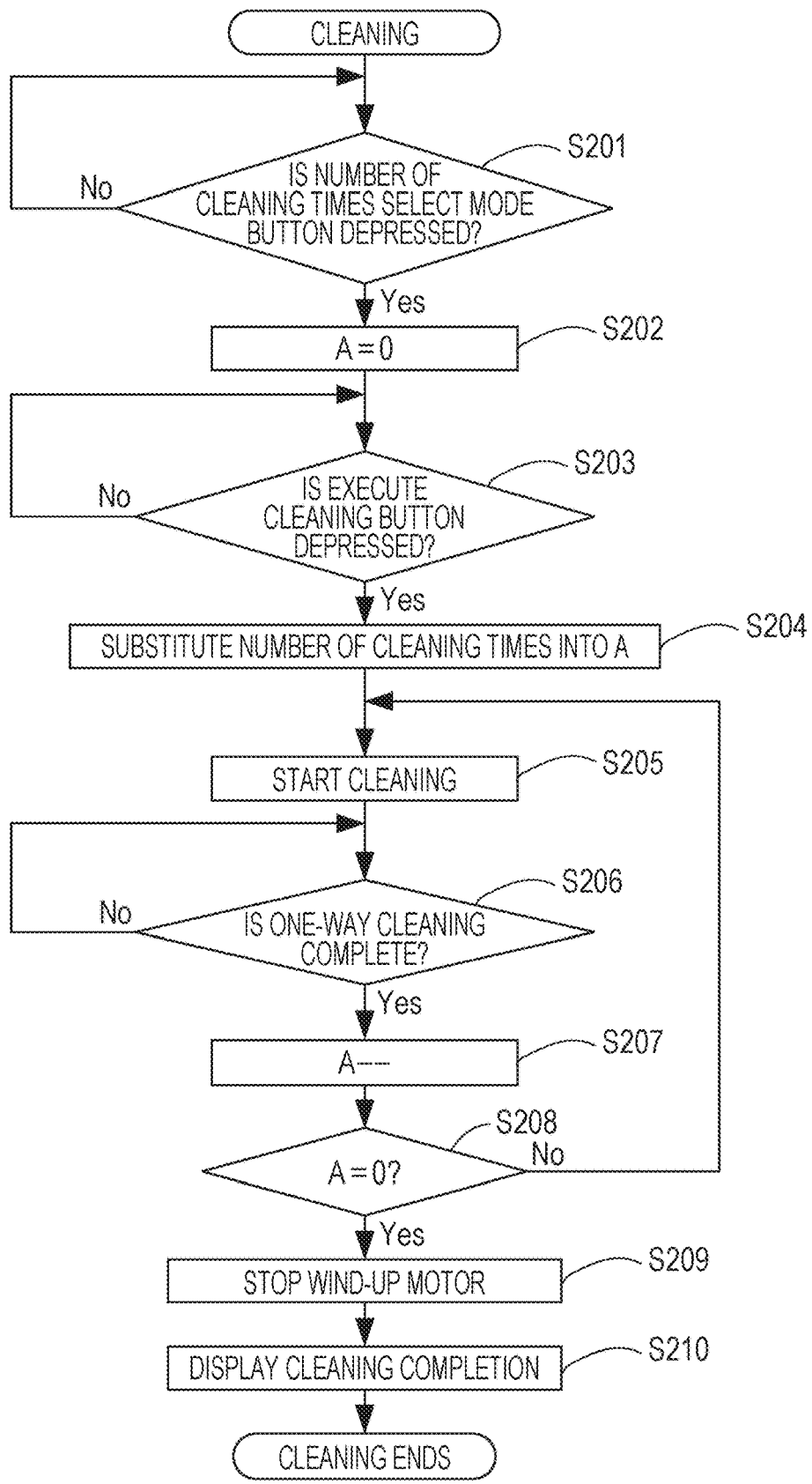
FIG. 9 is a flowchart showing a cleaning process in the second embodiment.

In the second embodiment, different from the first embodiment, an operator is enabled to select or input the number of cleaning times in the cleaning operation by the cleaning mechanism 51 (the number of times of movement of the first cleaning holder 511 and the second cleaning holder 512). Hereinafter, the control method will be described with reference to FIG. 8 and FIG. 9. FIG. 8 is a control block diagram showing a control configuration for performing the cleaning process in the second embodiment. FIG. 9 is a flowchart showing the cleaning process in the second embodiment.

In the second embodiment, contents that are displayed on the user interface 71 are different from those of the first embodiment, and an operator is enabled to optionally select the number of cleaning times in the cleaning operation by the cleaning mechanism 51. In other words, in the second embodiment, the first cleaning holder 511 and the second cleaning holder 512 are moved in accordance with the number of times selected by an operator to clean the transparent members 42a to 42d.

Figure 10A:
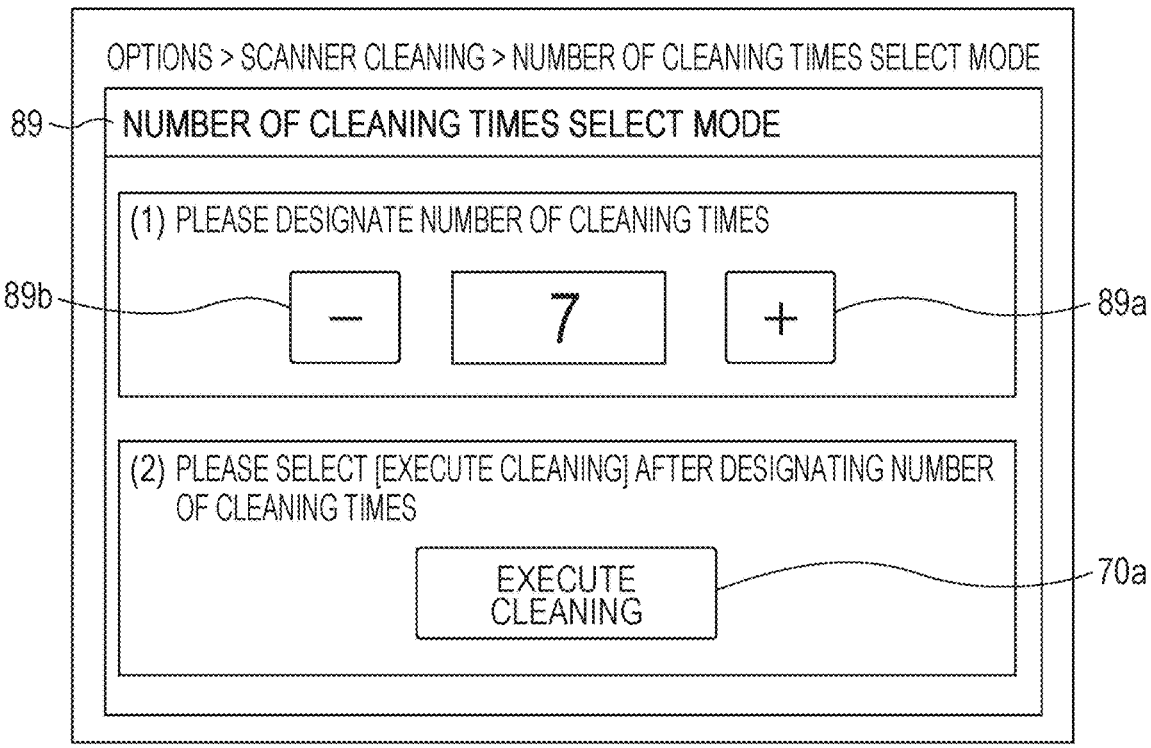
FIG. 10A is a view showing a user interface screen in the second embodiment.
Figure 10B:
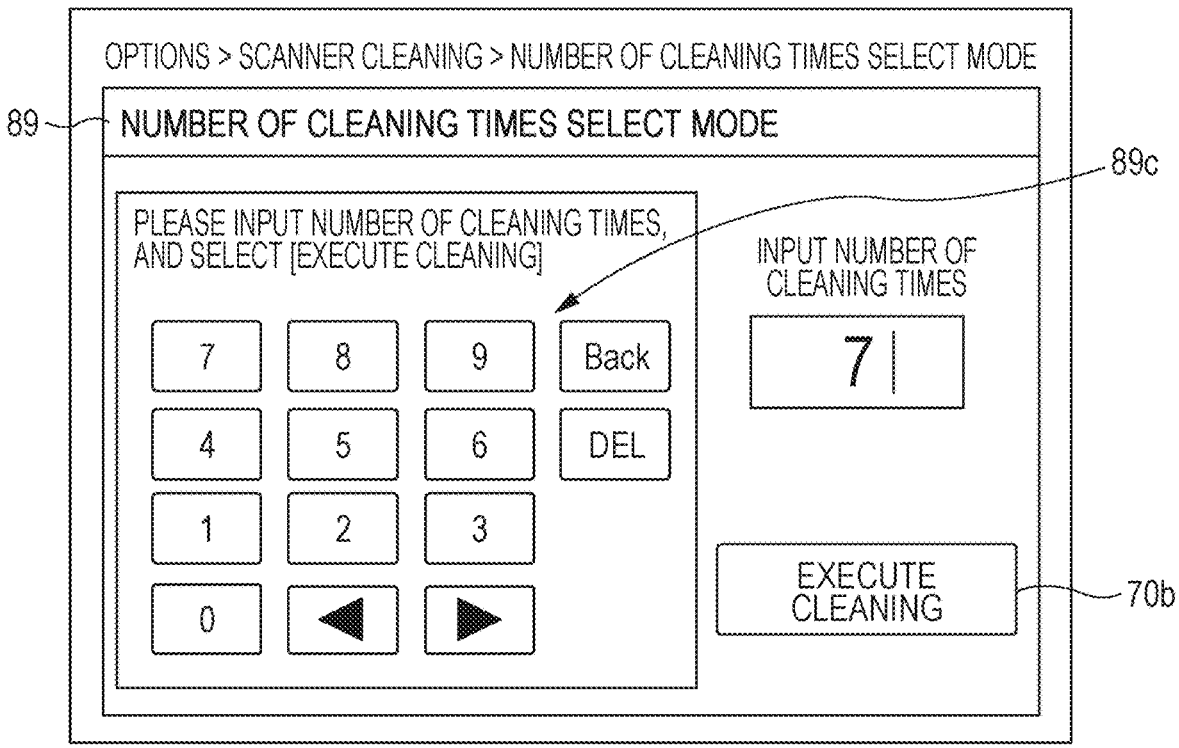
FIG. 10B is a view showing a user interface screen in the second embodiment.

Therefore, as shown in FIG. 8, the IC controller 73 receives a value set by an operator via the user interface 71 as shown in FIG. 10A or FIG. 10B via the engine control section 74 as the cleaning number of times information 90. The determination condition 88 (the number of times of cleaning operation) based on the cleaning number of times information 90 is output to the counter determination section 81 via the engine control section 74. At this time, the IC controller 73 stores the cleaning number of times information 90 in the RAM 501 and outputs the determination condition 88 in accordance with the details stored in the RAM 501. Thus, the IC controller 73 is capable of controlling a cleaning operation in accordance with a cleaning mode. In the present embodiment, the cleaning number of times information 90 is stored in the RAM 501 provided outside the IC controller 73. Alternatively, the cleaning number of times information 90 may be stored in an internal storage area provided inside the IC controller 73. The other control is similar to that of the first embodiment, so like reference numerals are assigned, and the description thereof is omitted.

In the second embodiment, FIG. 10 shows display on the user interface 71 for allowing an operator to select the number of times of cleaning operation. FIG. 10A is an example of a display screen. FIG. 10B is another example of a display screen.

On the screen shown in FIG. 10A, an operator is enabled to select the number of times of cleaning operation by operating a [+] key 89a or a [−] key 89b. The operator is enabled to select the number of cleaning times and provide an instruction to execute the cleaning process by inputting a desired number of times on the display screen and depressing an [EXECUTE CLEANING] key 70a.

On the screen shown in FIG. 10B, an operator is enabled to directly input the number of cleaning times in the cleaning operation by selecting a numeric key 89c. The operator is enabled to provide an instruction to perform the cleaning operation by inputting a desired number of cleaning times on the display screen and depressing an [EXECUTE CLEANING] key 70b. In the present embodiment, the cleaning operation is performed when the [EXECUTE CLEANING] key 70a or the [EXECUTE CLEANING] key 70b is depressed. Alternatively, the cleaning process may be executed when the number of times of cleaning operation is input by an operator.

In this way, the cleaning number of times information 90 selected by the operator in a cleaning number of times select mode 89 is output to the IC controller 73. The cleaning number of times information 90 output here is stored in the RAM 501 and is read out from the RAM 501 when the cleaning operation is performed.

Next, control that is executed by the IC controller 73 in the cleaning process of the second embodiment will be described by using the flowchart of FIG. 9.

Initially, the IC controller 73 determines whether the cleaning number of times select mode is selected by the operator via the user interface 71 (S201). When the cleaning number of times select mode is selected (Yes in S201), the IC controller 73 resets the count value of the number of cleaning times to zero (S202).

Subsequently, the IC controller 73 determines whether an instruction to execute cleaning from the operator has accepted (S203). When an instruction to execute cleaning has been accepted (Yes in S203), the IC controller 73 sets the number of cleaning times A in accordance with the value input in S201 before the instruction to execute cleaning is accepted in S203 (S204).

After that, the IC controller outputs the motor control signal 77 to the wind-up motor 55 to start reciprocation of the first cleaning holder 511 and the second cleaning holder 512 (S205). Thus, the cleaning process operation is started by the cleaning mechanism 51. At this time, the motor control signal 77 that is output to the wind-up motor 55 includes a signal to control for rotating the wind-up motor 55 in the forward direction or in the reverse direction, and it is possible to control running of the wire 54 in the arrow D1, D2 directions.

Subsequently, the IC controller 73 determines in accordance with the detection result of the current detecting section 79 whether the driving current of the wind-up motor 55 has increased, and, in accordance with the determination, determines whether movement of the first cleaning holder 511 and the second cleaning holder 512 from one end to the other end of the transparent members 42a to 42d is complete (S206). When movement of the first cleaning holder 511 and the second cleaning holder 512 from one end to the other end of the transparent members 42a to 42d is not complete (No in S206), the IC controller 73 continues driving the wind-up motor 55 for rotation to continue movement of the first cleaning holder 511 and the second cleaning holder 512.

When movement of the first cleaning holder 511 and the second cleaning holder 512 from one end to the other end is complete (Yes in S206), the IC controller 73 counts down the count value by one from the number of cleaning times A set in S204 (S207).

After that, the IC controller 73 determines whether the result of S207 is zero (S208). When the result of S208 is not zero and movement of the first cleaning holder 511 and the second cleaning holder 512 is not complete (No in S208), the process returns to S205, the IC controller 73 rotates the wind-up motor 55 in a direction opposite to the last rotation direction to start movement of the first cleaning holder 511 and the second cleaning holder 512 in the opposite direction. When the result of S207 is zero and it is determined that movement of the first cleaning holder 511 and the second cleaning holder 512 is complete (Yes in S208), the IC controller 73 stops driving of the wind-up motor 55 (S209) and outputs the cleaning completion notice 85 to the user interface 71 (S210). Thus, completion of the cleaning operation is informed to the operator via the user interface 71, and the cleaning process in the flowchart of FIG. 9 ends.

In the second embodiment, the operator is enabled to optionally input the number of cleaning times. Alternatively, multiple numerals indicating the number of times may be displayed on the user interface 71, and the numerals may be selected by the operator to input the number of cleaning times.

In the second embodiment as well, the embodiment is not limited thereto. Alternatively, in an apparatus in which the image forming apparatus 1 performs the cleaning operation in accordance with the number of cleaning times (the number of times of reciprocation of the first cleaning holder 511 and the second cleaning holder 512) set by an operator, the embodiment may be configured as follows.

For example, when the image forming apparatus 1 completes a predetermined number of sheets (for example, 5000 sheets) of image forming operation, the apparatus may enable an operator to set the number of cleaning times from the user interface 71 so as to perform the cleaning operation in accordance with the number of cleaning times set by the operator. When the cleaning operation is performed at any timing, the apparatus may enable an operator to set the number of cleaning times from the user interface 71 so as to perform the cleaning operation in accordance with the set number of cleaning times.

Alternatively, the number of cleaning times at the time when the image forming apparatus completes a predetermined number of sheets of image forming operation may be set to one, and the image forming apparatus may be configured to perform the cleaning operation in accordance with the number of cleaning times set by an operator at any timing. A method of counting in the counter determination section 81 may be not a method of counting down but a method of counting up. In this case, it may be determined that the cleaning operation is complete when the count value becomes greater than or equal to the number of times of cleaning operation.

Alternatively, the image forming apparatus 1 may be configured to set the number of cleaning times of the cleaning operation that is performed at any timing to one, and, when the image forming apparatus 1 completes a predetermined number of sheets of image forming operation, the image forming apparatus 1 may be configured to perform the cleaning operation in accordance with the number of cleaning times set by an operator.

The number of cleaning times in the cleaning operation that is performed at any timing and the number of cleaning times in the cleaning operation that is performed at the time when a predetermined number of sheets of image forming operation completes may be enabled to be individually set from the user interface 71.

As described above, with a configuration in which an operator is enabled to set any number of cleaning times, even when condensation or the like occurs inside the image forming apparatus 1 and foreign matter that is difficult to remove only by reciprocating the cleaning members on the transparent members 42 once is present, it is possible to prevent residual foreign matter on the transparent members. Even when the cleaning performance of the cleaning members 53 decreases depending on the condition of the image forming apparatus 1, it is possible to prevent residual foreign matter on the transparent members by performing a cleaning operation multiple times. With this configuration, it is possible to suppress a decrease in image quality due to residual foreign matter on the transparent members.

Third Embodiment

Next, a third embodiment will be described. The third embodiment is similar to the first embodiment and the second embodiment except that control of a cleaning process that uses the cleaning mechanism 51 is different, so like reference numerals denote the same components, and the description thereof is omitted.

In the third embodiment, different from the first and second embodiments, an operator is enabled to select the area of cleaning and the number of cleaning times of the transparent members 42 by the cleaning mechanism 51. In other words, in the present embodiment, the area of movement and the number of times of movement of the cleaning members 53 on the transparent members 42 are selectable. Hereinafter, the configuration will be described with reference to FIG. 11 to FIG. 14.

Figure 11:
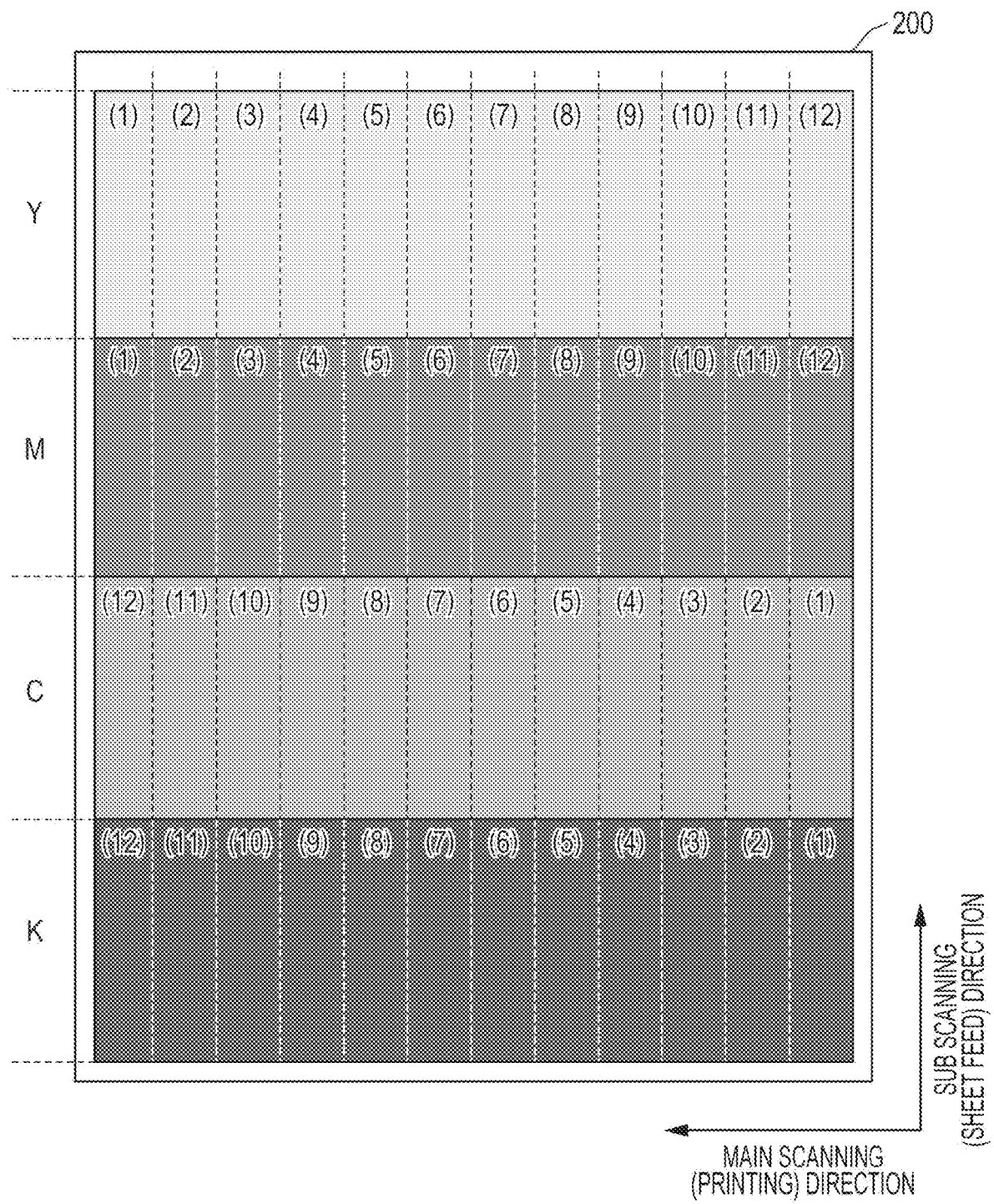
FIG. 11 is a view showing a cleaning chart in a third embodiment.

Initially, in the present embodiment, to allow an operator to select a location of cleaning (area of movement) by the cleaning members 53, a cleaning chart 200 shown in FIG. 11 is formed on a sheet P as an image by the image forming apparatus 1 and is output to the outside of the apparatus. In the cleaning chart 200, images using toner of four colors, that is, yellow Y, magenta M, cyan C, and black K, which are used in the image forming apparatus 1 of the present embodiment, are formed.

As described above, the image forming operation is performed by applying a beam from the optical scanning device 40 to each of the photosensitive members 100Y, 100M, 100C, 100Bk, forming an electrostatic latent image on each photosensitive member 100, and developing the electrostatic latent image with the developing machine by using toner of an associated color. In FIG. 11, a main scanning direction is set to the rotation axis direction of each photosensitive member 100, and a sub scanning direction is set to a sheet conveying direction. The cleaning chart 200 is a chart in which an image is formed in each of the areas for the image forming parts 10Y, 10M, 10C, 10Bk. In other words, when images of the cleaning chart 200 are created, beams that are emitted from the optical scanning device 40 are scanned from all the areas of the transparent members 42a to 42d in the longitudinal directions to the photosensitive members 100Y, 100M, 100C, 100Bk. In the cleaning chart 200, numbers (1) to (12) corresponding to the positions, in the longitudinal direction, of each of the transparent members 42a to 42d (the rotation axis direction of each photosensitive member 100) are assigned as shown in FIG. 12.

Figure 12:
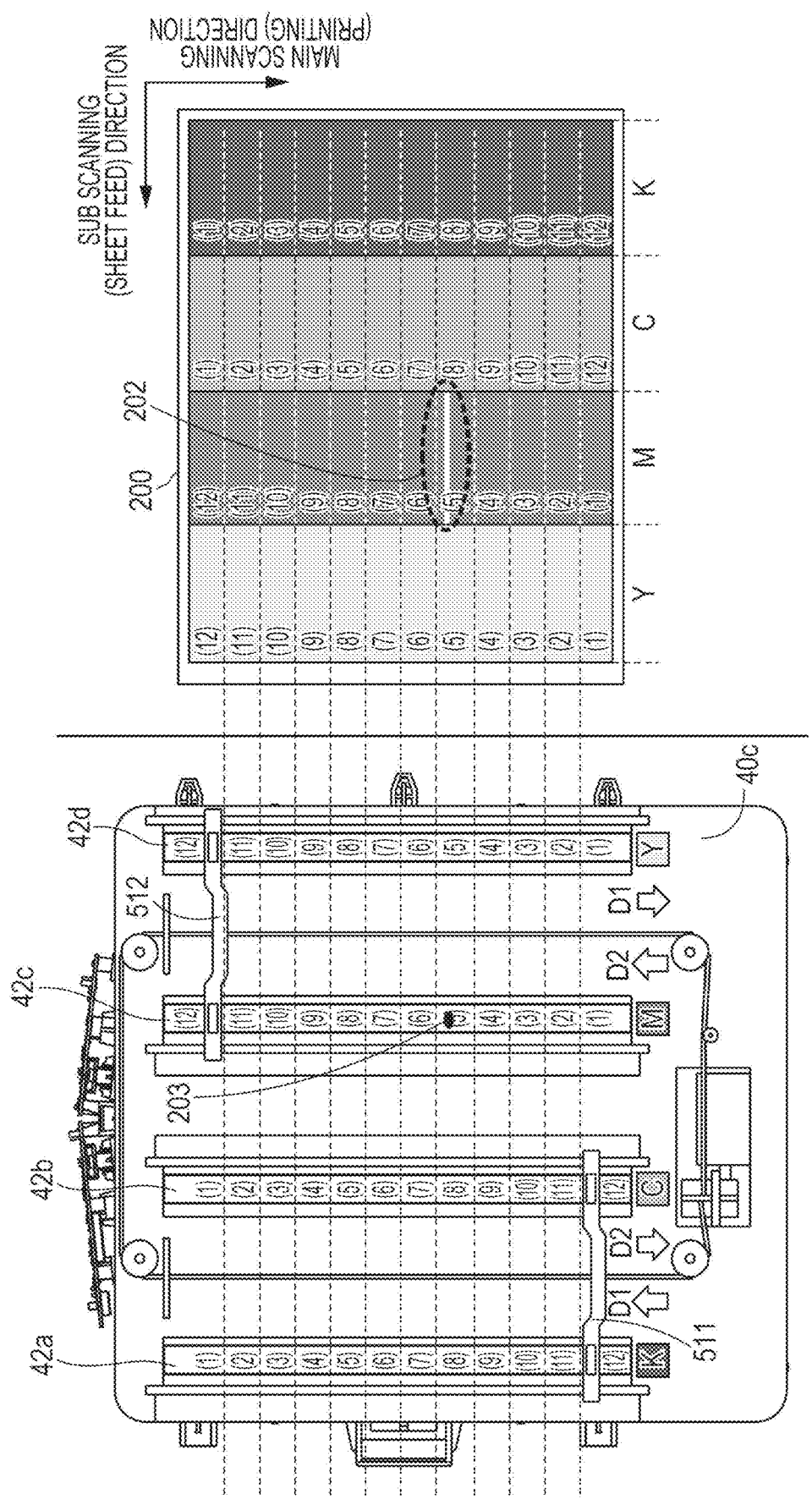
FIG. 12 is a view showing a correspondence between the cleaning chart and the optical scanning device in the third embodiment.

Therefore, when foreign matter 203 is present at position (5) of the transparent member 42c as shown in FIG. 12, a white line 202 occurs at the position (5) in the cleaning chart 200 formed by the image forming apparatus 1 as shown in FIG. 12. This is because a laser beam that passes through the transparent member 42c is cut off by the foreign matter 203 at the position (5), no laser beam is applied to the photosensitive member 100M, and a toner image of magenta M is not formed.

By printing the cleaning chart 200 and allowing an operator to check the cleaning chart 200 in this way, the operator is enabled to recognize at which position on the transparent members 42a to 42d foreign matter is present.

By allowing the operator to select the position of an abnormal image via the user interface 71 in accordance with the printed cleaning chart 200, it is possible to identify a position (the area of movement of the cleaning members 53) that needs cleaning by the cleaning mechanism 51. Therefore, in the present embodiment, it is possible to clean only a position selected by an operator by using the cleaning mechanism 51.

Figure 13:
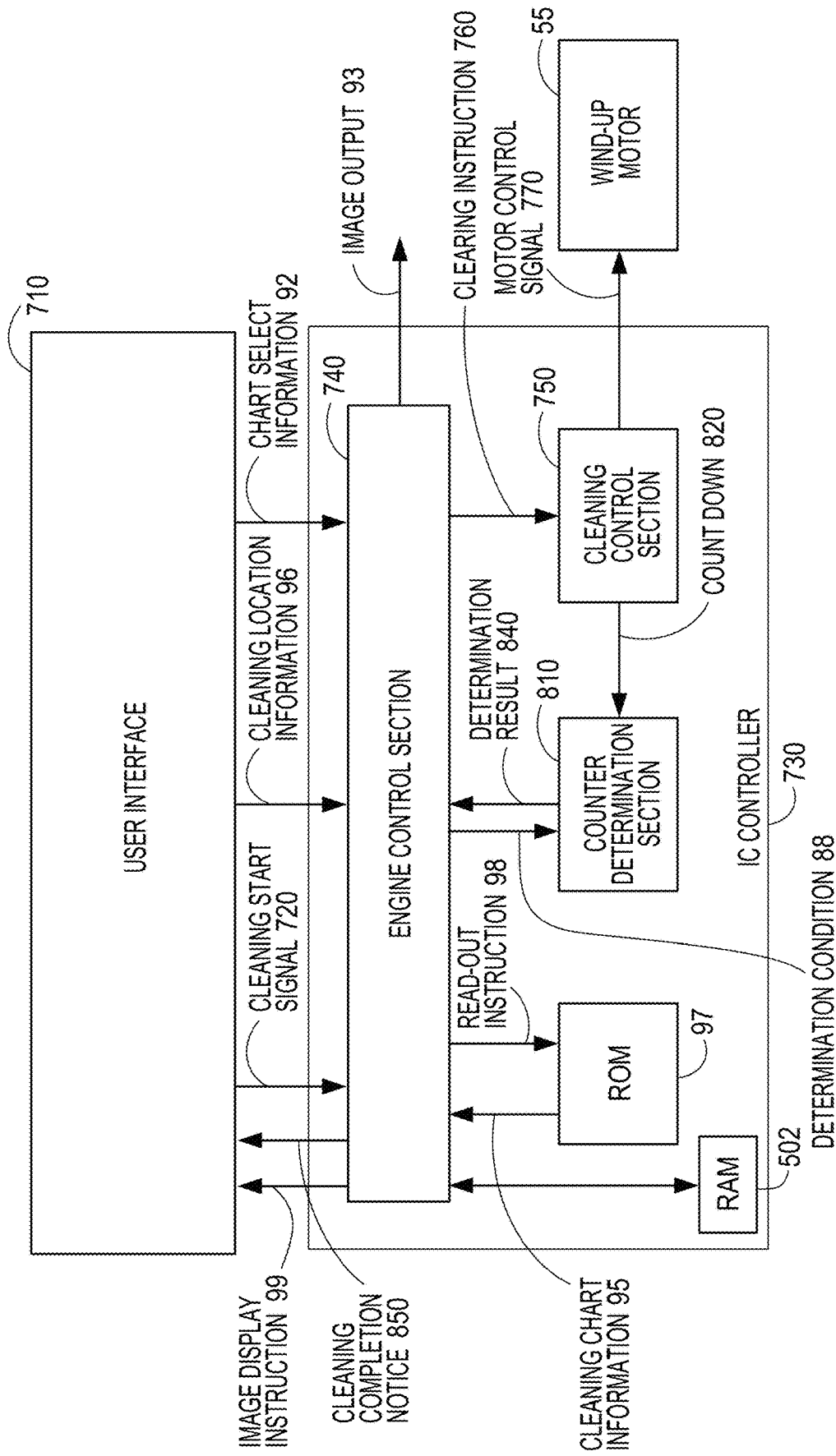
FIG. 13 is a block diagram showing a control configuration in the third embodiment.
Figure 14:
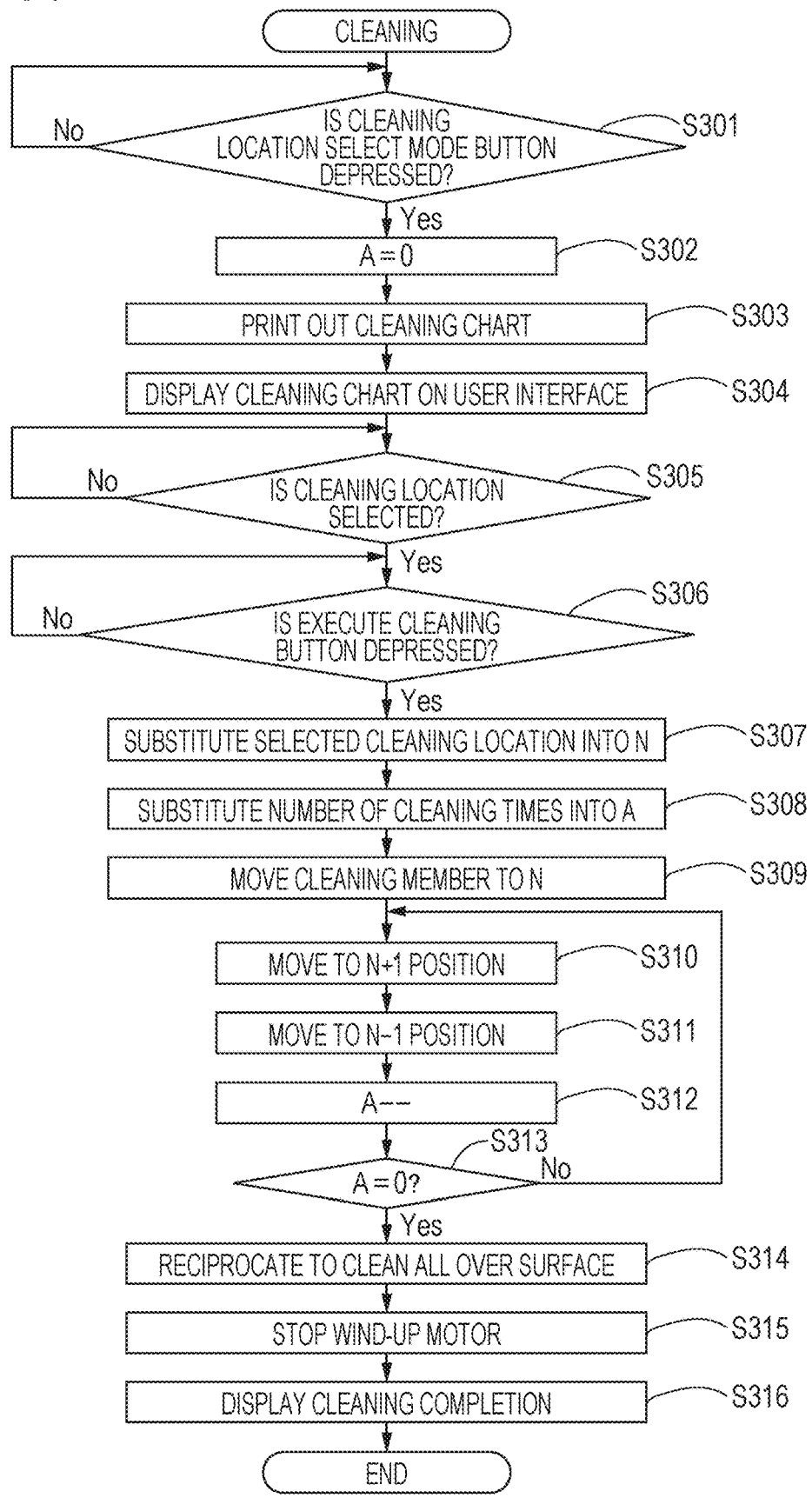
FIG. 14 is a flowchart showing a cleaning process in the third embodiment.

Next, a control method of the cleaning process in the third embodiment will be described with reference to FIG. 13 and FIG. 14. FIG. 13 is a control block diagram showing a control configuration for executing the cleaning process in the third embodiment. FIG. 14 is a flowchart of an IC controller 730 at the time of executing the cleaning process in the third embodiment. The IC controller 730 is a controller circuitry which may include one or more processors such as central processing units (CPUs), microprocessor units (MPUs), digital signal processors (DSPs), and/or field programmable gate arrays (FPGAs) or the like. The one or more processors execute a computer program stored in a memory (e.g. ROM 97) to implement various features of the IC controller 730. The user interface 710 may include an input device to accept user inputs and a display device to display information.

As shown in FIG. 13, in the third embodiment, an IC controller 730 that controls the cleaning mechanism 51 is provided. The IC controller 730 includes an engine control section 740, a cleaning control section 750, a counter determination section 810, ROM 97, and RAM 502 as internal modules. The IC controller 730 is configured to control a user interface 710 and the wind-up motor 55 via these modules. Hereinafter, control of the cleaning process that is executed by the IC controller 730 by using the modules will be described.

The IC controller 730 executes various control by reading out a firmware program stored in the ROM 97 and a boot program for controlling the firmware program via the engine control section 740 and using RAM 502 as a working area and a temporary storage area for data. The IC controller 730 is an example of the controller circuitry.

The IC controller 730 is capable of acquiring setting information from an operator via the user interface 710 that is displayed on an operating unit (not shown) provided in the image forming apparatus 1 and inform the operator of various pieces of information. The operating unit (not shown) is an example of the user interface and is, as in the case of the first embodiment, made by stacking, for example, a resistive-type or capacitive-type touch panel and a liquid crystal display-type display panel on top of each other. The user interface 710 is configured to enable an operator to perform an operation via the touch panel in accordance with display on the display panel.

The IC controller 730 displays the user interface 710 that allows an operator to make selection via the engine control section 740, and the operator makes input in accordance with the display. Thus, setting information is acquired from the operator. At this time, buttons and the like for selecting print cleaning chart to print out a cleaning chart, selecting the location of cleaning or the number of cleaning times, and execute cleaning for starting the cleaning process by the operator are displayed on the user interface 710. The operator is enabled to make various settings of the cleaning process by operating the user interface 710.

When a cleaning location select mode is selected by the operator via the user interface 710, the location of cleaning and the number of cleaning times are output to the engine control section 740 in the IC controller 730 as cleaning location information 96. At this time, the IC controller 730 stores the cleaning location information 96 in the RAM 502. In the present embodiment, the cleaning location information 96 is stored in the RAM 502 provided in the IC controller 730. Alternatively, the cleaning location information 96 may be stored in another storage area provided outside the IC controller 730. When the execute cleaning is selected, a cleaning start signal 720 is output to the engine control section 740 in the IC controller 730. When the print cleaning chart is selected by the operator, chart select information 92 is output to the engine control section 740 in the IC controller 730. Thus, the IC controller 730 accepts an instruction from the operator via the user interface 710.

When the print cleaning chart 91 is selected by the operator, the IC controller 730 outputs an instruction 98 to read out the cleaning chart 200 stored in the ROM 97 via the engine control section 740. After that, an image output signal 93 is output in accordance with the cleaning chart information 95 read out from the ROM 97, and the image forming parts 10 and the optical scanning device 40 are operated to form the images of the cleaning chart 200 on a sheet P and output the sheet P to the output tray outside the main body of the apparatus. In this way, the IC controller 730 controls the image forming parts 10 and the optical scanning device 40 to output a cleaning chart by outputting the image output signal 93 in accordance with the cleaning chart 200 stored in the ROM 97.

The IC controller 730 outputs an image display instruction 99 to the user interface 710 via the engine control section 740 and displays the same images as the cleaning chart 200 on the interface 710.

As described above, in the cleaning chart 200, numbers (1) to (12) corresponding to the positions, in the longitudinal direction, of each of the transparent members 42a to 42d (the rotation axis direction of each of the photosensitive members 100) are assigned. By using the numbers, the operator identifies a location where an abnormal image, such as a white line, is occurring and selects the identified abnormal location via the user interface 710.

In the present embodiment, when the operator selects an abnormal location, the operator is also enabled to select the number of cleaning times for the abnormal location. Thus, the IC controller 730 is able to acquire an abnormal location and the number of cleaning times, set by the operator via the user interface 710.

The IC controller 730 outputs a cleaning instruction 760 to the cleaning control section 750 via the engine control section 740 in accordance with the cleaning location information 96 set by the operator. At this time, a signal of the cleaning instruction 760 may include the location of cleaning and the number of cleaning times, set by the operator. The IC controller 730 outputs a motor control signal 770 to the wind-up motor 55 via the cleaning control section 750 in accordance with the cleaning instruction 760.

The wind-up motor 55 is a motor (for example, a stepping motor) of which the rotation angle is controllable by using an input pulse. With this configuration, it is possible to control the rotation angle of the motor, so it is possible to control the position where the wire 54 moves. Therefore, by reciprocating the first cleaning holder 511 and the second cleaning holder 512 only at a location selected through the cleaning location select mode, it is possible to locally clean a selected position on the transparent members 42a to 42d.

The IC controller 730 outputs a determination condition 880 based on the number of cleaning times, included in the acquired cleaning location information 96, to the counter determination section 810 by using the engine control section 740.

The IC controller 730 controls the cleaning control section 750 such that a count down signal 820 is output to the counter determination section 810 each time the wind-up motor 55 is switched between forward rotation and reverse rotation. The IC controller 730 counts down one by one from the number of cleaning times, set in accordance with the determination condition 880, by the counter determination section 810 each time a count down signal 820 is output, and outputs a determination result 840 to the engine control section 740.

At this time, the IC controller 730 determines via the engine control section 740 whether the value counted down by the counter determination section 810 is zero and, when the determination result is zero, determines that the cleaning process operation is complete; whereas, when the determination result is not zero, determines that the cleaning process operation is not complete.

When it is determined that the cleaning process operation is complete, the IC controller 730 stops the wind-up motor via the engine control section 740 and the cleaning control section 750 and outputs a cleaning completion notice 850 to the user interface 710.

The user interface 710, in accordance with this, displays that the cleaning process is complete on the display (not shown) to inform the operator that the cleaning operation is complete. In contrast, when it is determined that the cleaning process operation is not complete, the IC controller 730 outputs the cleaning instruction 760 to the cleaning control section 750 again and controls the wind-up motor 55 via the cleaning control section 750 to repeat the cleaning operation. The cleaning control section 750 is capable of controlling the first cleaning holder 511 and the second cleaning holder 512 so as to reciprocate by rotating the wind-up motor 55 in the forward and reverse directions.

In the third embodiment, the IC controller 730 incorporates the engine control section 740, the cleaning control section 750, the ROM 97, and the counter determination section 810; however, the configuration is not necessarily limited thereto. For example, modules different from the internal modules of the IC controller 730 described in the present embodiment may be used to implement control in the cleaning process that is executed by the IC controller 730 or may be configured to incorporate the RAM 502.

In the third embodiment, the motor (for example, a stepping motor) of which the rotation angle of the wind-up motor 55 is controllable is used. Alternatively, a brush motor or a brushless motor of which the motor rotation angle (the running distance of the wire 54) can be measured from an input time of the motor control signal 770 may be used. Alternatively, the rotation angle of the wind-up motor 55 may be detected by a sensor (for example, an encoder) provided to detect the rotation angle of the wind-up motor 55.

Next, the cleaning process that is executed by the IC controller 730 of the third embodiment will be described with reference to the flowchart of FIG. 15.

Initially, the IC controller 730 determines whether the cleaning location select mode is selected by the operator via the user interface 710 (S301). When the cleaning location select mode 94 is selected (Yes in S301), the IC controller 730 resets the count value of the number of cleaning times to zero (S302).

After that, the IC controller 730 acquires the cleaning chart 200 from the ROM 97, outputs the image of the acquired cleaning chart 200 to the image forming parts 10 and the optical scanning device 40 as the image output signal 93, and prints out the cleaning chart 200 on a sheet (S303).

Subsequently, the IC controller 730 displays the image of the printed cleaning chart on the user interface 710 (S304). Here, the image of the cleaning chart 200 as shown in FIG. 11 is displayed on the user interface 710. The operator is enabled to input the location of cleaning and the number of cleaning times from a screen on the displayed user interface 710.

Subsequently, the IC controller 730 determines whether the location of cleaning and the number of cleaning times are set by the operator via the user interface 710 (S305). When, for example, the cleaning chart as shown in FIG. 12 is printed out, the operator selects position (5) at which a white line is occurring. When the location of cleaning and the number of cleaning times are input by the operator (Yes in S305), it is determined whether an instruction to execute cleaning is provided by the operator (S306).

When an instruction to execute cleaning is provided by the operator (Yes in S306), the IC controller 730 substitutes the location of cleaning ((5) in the case of FIG. 12) selected by the operator in S305 into N that is a numeric value indicating the location of cleaning (S307). The IC controller 730 sets the number of cleaning times selected by the operator in S305 as the number of cleaning times A (S308).

After that, the IC controller 730 outputs the motor control signal 770 to the wind-up motor 55 via the cleaning control section 750 and causes the first cleaning holder 511 and the second cleaning holder 512 to move to the area of cleaning N set in S307 (S309). In the present embodiment, the motor control signal 770 includes the number of rotation of the wind-up motor 55, which causes the first cleaning holder 511 and the second cleaning holder 512 to move to the area of cleaning N.

After that, the IC controller 730 outputs the motor control signal 770 (pulse number), which causes the first cleaning holder 511 and the second cleaning holder 512 to move to position N+1 of the area of cleaning (here, area (6)), to the wind-up motor 55 (S310). Subsequently, the IC controller 730 outputs the motor control signal 770 (pulse number), which causes the first cleaning holder 511 and the second cleaning holder 512 to move to position N−1 of the area of cleaning (here, area (4)) (S311). With this configuration, the first cleaning holder 511 and the second cleaning holder 512 are enabled to reciprocate to clean only a necessary area of cleaning.

When one reciprocation of the first cleaning holder 511 and the second cleaning holder 512 completes, the IC controller 730 counts down the count value by one from the number of cleaning times A set in S308 (S312).

After that, the IC controller 730 determines whether the result of S313 is zero (S313). When the result of S312 is not zero and movement of the first cleaning holder 511 and the second cleaning holder 512 is not complete (No in S313), the process returns to S310, and the motor control signal 770 is output via the cleaning control section 750 to operate the wind-up motor 55 again.

When the result of S313 is zero and it is determined that movement of the first cleaning holder 511 and the second cleaning holder 512 is complete (Yes in S313), the IC controller 730 controls the wind-up motor 55 such that all the areas (1) to (12) are cleaned (S314). At this time, the IC controller 730 outputs the motor control signal 770 to the wind-up motor 55 via the cleaning control section 750 such that movement covers all the areas of the transparent members 42a to 42d. Cleaning all the areas of the transparent members 42a to 42d (all the areas from one end to the other end) after local cleaning is performed in this way is to avoid residual removed foreign matter on the transparent members 42a to 42d.

After that, the IC controller 730 stops driving of the wind-up motor 55 (S315) and outputs the cleaning completion notice 850 to the user interface 710 (S316). Thus, completion of the cleaning operation is informed to the operator via the user interface 710, and the cleaning process in the flowchart of FIG. 9 ends.

With such a configuration, even when condensation or the like occurs inside the image forming apparatus 1 and foreign matter that is difficult to remove only by reciprocating the cleaning members on the transparent members 42 once is present, it is possible to prevent residual foreign matter on the transparent members with the number of cleaning times set by the operator. With this configuration, it is possible to suppress a decrease in image quality due to residual foreign matter on the transparent members.

In the third embodiment, locations of the cleaning chart 200 shown in FIG. 11 to be selected are (1) to (12); however, the number of divided locations of cleaning is not limited thereto and may be set to any number or may be configured to divide each of the transparent members 42a to 42d into, for example, four in the longitudinal direction (the rotation axis direction of each photosensitive member 100).

In the third embodiment, an example in which an operator is allowed to select one location for the area of cleaning is described. Alternatively, an operator may be enabled to select multiple areas. When, for example, the areas (5) to (8) on the transparent members are selected by an operator, the cleaning members may be configured to reciprocate in the areas (4) to (9) on the transparent members. In the third embodiment, not only an area selected by an operator but also adjacent areas on both sides are also subjected to cleaning operation. Alternatively, only an area selected by an operator may be subjected to cleaning operation. In this case as well, by moving the cleaning members over all the areas from one end to the other end of the transparent members after completion of a cleaning operation in the cleaning area selected by an operator, it is possible to prevent residual foreign matter on the transparent members.

The cleaning chart 200 shown in FIG. 11 is an image for which colors of YMCBk are output at high densities; however, the cleaning chart 200 is not limited to such an image. The cleaning chart 200 may be a chart that gradually shades, a chart in which characters or symbols are arranged (for example, a chart in which grids are arranged), or the like.

An operator may be allowed to select the area of cleaning without printing the cleaning chart 200. For example, when an operator has selected the cleaning location select mode, an image printed just before may be displayed on the user interface 710 to allow the operator to select the location of cleaning.

As described above, by enabling an operator to set the area of cleaning and any number of cleaning times, it is possible to further accurately remove residual foreign matter on the transparent members 42. Even when condensation or the like occurs inside the image forming apparatus 1 and foreign matter that is difficult to remove only by reciprocating the cleaning members on the transparent members 42 once is present, it is possible to prevent residual foreign matter on the transparent members. Even when the cleaning performance of the cleaning members 53 decreases depending on the condition of the image forming apparatus 1, it is possible to prevent residual foreign matter on the transparent members by performing a cleaning operation multiple times. With this configuration, it is possible to suppress a decrease in image quality due to residual foreign matter on the transparent members.

Other Embodiments

In the above-described embodiments, the first cleaning holder 511 and the second cleaning holder 512 that hold the cleaning members 53a to 53d are moved by using the wire 54; however, the configuration is not limited thereto. For example, a spiral screw shaft and a holder that is engaged with the screw shaft to move with rotation of the screw shaft may be provided, the holder may hold the cleaning members, and the holder may be configured to move the cleaning members in the longitudinal directions of the transparent members with rotation of the screw shaft.

Even when the configuration that moves the cleaning members is modified in this way, it is possible to prevent residual foreign matter on the transparent members by enabling an operator to set the number of times of cleaning operation as described above.

In the above-described embodiments, the fact that the first cleaning holder 511 and the second cleaning holder 512 are brought into contact with the first stopper 56a and the second stopper 56b is detected by a change in the driving current of the wind-up motor 55; however, the configuration is not limited thereto. For example, a photosensor may be provided at an end portion of the transparent members 42 in the longitudinal direction, and a member that cuts off the optical axis of the photosensor with movement of the transparent members 42 to the end portions in the longitudinal direction may be provided in the first cleaning holder 511 and the second cleaning holder 512. With this configuration as well, it is possible to detect the fact that the cleaning members 53 have moved to the end portions of the transparent members 42. A configuration other than the above-described configuration may be used as long as it is possible to detect that the cleaning members 53 have moved to the end portions of the transparent members 42.

In the above-described embodiments, an operator is enabled to set the number of times of reciprocation of the cleaning members 53 on the transparent members 42. Alternatively, an operator may be enabled to set the number of times of movement from one end side to the other end side of the transparent members 42. In this case, when the number of cleaning times set by an operator is three, the cleaning members 53 are moved to reciprocate once and move from one end side to the other end side. In other words, movement of the first cleaning holder 511 and the second cleaning holder 512 is stopped at end portion sides opposite from cleaning start positions in the longitudinal directions of the transparent members 42. With such a configuration as well, it is possible to clean the transparent members 42 the number of times desired by an operator.

In the above-described embodiments, settings are accepted from an operator by operating the touch panel on the screen displayed on the user interface. Alternatively, an input key that enables a user to input may be provided separately from the display panel, and setting may be accepted from the operator by allowing the operator to depress the input key.

In the above-described embodiments, settings are accepted from an operator via the user interface. Alternatively, an electronic device, such as a personal computer, may be connected to the image forming apparatus 1 to perform settings on the cleaning operation or may connect an external terminal, such as a USB, to perform settings on the cleaning operation.

According to the present invention, it is possible to reduce foreign matter remaining on a transparent member and suppress a decrease in image quality.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus comprising:
a photosensitive member;
an optical scanning device provided with a transparent member configured to allow a laser beam to pass through the transparent member so that the photosensitive member is scanned by the laser beam through the transparent member;
a developing unit configured to develop, by using toner, an electrostatic latent image formed on the photosensitive member by the laser beam, wherein the optical scanning device is provided below the photosensitive member and the developing unit in a vertical direction;
an image forming unit configured to transfer an image developed by the developing unit onto a printing medium configured to fix the image on the printing medium;
a cleaning mechanism configured to clean the transparent member, wherein the cleaning mechanism includes a cleaning member configured to contact with the transparent member and a movement member configured to reciprocally move the cleaning member along a direction in which the laser beam scans; and
a display unit configured to display a screen to select the number of times of reciprocal movement of the cleaning member which is moved by the movement member,
wherein the display unit is configured to accept, through the screen, selection of the number of times of reciprocal movement of the cleaning member which is moved by the movement member, and
wherein the movement member is configured to reciprocally move the cleaning member based on the selected number of times of reciprocal movement.

2. The image forming apparatus according to claim 1, wherein the movement member is configured to move in accordance with any one of a first cleaning mode and a second cleaning mode in which the number of times of reciprocal movement of the cleaning member is greater than the number of times of reciprocal movement of the cleaning member in the first cleaning mode, and
wherein the display unit is configured to accept selection of any one of the first cleaning mode and the second cleaning mode.

3. The image forming apparatus according to claim 2, wherein the display unit is configured to accept, from an operator, selection of the number of times of reciprocal movement of the cleaning member, and
wherein, when the second cleaning mode is selected, the movement member is controlled in accordance with the selected number of times of reciprocal movement.

4. The image forming apparatus according to claim 3, wherein the display unit includes a display configured to display the first cleaning mode and the second cleaning mode through which any one of the first cleaning mode and the second cleaning mode is selectable by the operator.

5. The image forming apparatus according to claim 1, wherein the display unit is configured to accept, from an operator, selection of a numeric value that represents the number of times of reciprocal movement of the cleaning member, and
wherein the movement member is configured to move in accordance with the accepted numeric value.

6. The image forming apparatus according to claim 1, wherein a select mode in which an area of movement of the cleaning member by the movement member is acceptable via the display unit, and
wherein, when the select mode is accepted via the display unit, the movement member moves in accordance with the selected number of times of reciprocal movement and an area of movement based on an inputted instruction.

7. The image forming apparatus according to claim 6, wherein, after the cleaning member is moved in accordance with the selected number of times of reciprocal movement and the area of movement based on the inputted instruction, the movement member moves such that the cleaning member reciprocally moves about an entire area of the transparent member.

8. The image forming apparatus according to claim 1, wherein the photosensitive member is a first photosensitive member, the transparent member is a first transparent member configured to allow light from the optical scanning device to pass through the first transparent member to the first photosensitive member, and the cleaning member is a first cleaning member configured to clean the first transparent member, the image forming apparatus further comprising:
- a first development unit configured to develop, as a first electrostatic latent image, the electrostatic latent image to be formed on the first photosensitive member;
- a second photosensitive member different from the first photosensitive member;
- a second development unit configured to develop a second electrostatic latent image, to be formed on the second photosensitive member, by using toner in color different from color of toner used by the first development unit;
- a second transparent member configured to allow light from the optical scanning device to pass through the second transparent member to the second photosensitive member;
- a second cleaning member configured to clean the second transparent member; and
- the movement member, wherein the movement member includes:
  - a holding member holding the first cleaning member and the second cleaning member,
  - a wire coupled to the holding member between the first cleaning member and the second cleaning member, wherein multiple pulleys place the wire under tension so that the wire passes between the first transparent member and the second transparent member,
  - a wind-up drum configured to wind up the wire, and
  - an actuator configured to rotationally drive the wind-up drum to cause the holding member to perform reciprocal movement.

9. The image forming apparatus according to claim 1, wherein the display unit is configured to display the screen to select the number of times of reciprocal movement of the cleaning member from multiple candidates and is configured to accept, through the screen, selection of the number of times of reciprocal movement of the cleaning member from the multiple candidates.

* * * * *